(12) United States Patent
Wakeham

(10) Patent No.: US 11,401,002 B2
(45) Date of Patent: Aug. 2, 2022

(54) BICYCLE CRANKARM HAVING A STRESS/STRAIN DETECTOR FOR A TORQUE METER OR A POWER METER, AND METHODS FOR MANUFACTURING AND USING THE CRANKARM

(71) Applicant: Campagnolo S.r.l., Vicenza (IT)

(72) Inventor: Keith Joseph Wakeham, Calgary (CA)

(73) Assignee: Campagnolo S.r.l., Vicenza (IT)

( * ) Notice: Subject to any disclaimer, the term of this patent is extended or adjusted under 35 U.S.C. 154(b) by 269 days.

(21) Appl. No.: 16/407,822

(22) Filed: May 9, 2019

(65) Prior Publication Data
US 2019/0346323 A1   Nov. 14, 2019

(30) Foreign Application Priority Data

May 11, 2018  (IT) .................. 102018000005302

(51) Int. Cl.

| | |
|---|---|
| *B62M 3/16* | (2006.01) |
| *G01L 1/22* | (2006.01) |
| *G01L 3/14* | (2006.01) |
| *G01L 3/24* | (2006.01) |
| *G01L 5/13* | (2006.01) |
| *B62J 45/411* | (2020.01) |
| *B62J 45/421* | (2020.01) |

(52) U.S. Cl.
CPC .............. *B62M 3/16* (2013.01); *B62J 45/411* (2020.02); *B62J 45/421* (2020.02); *G01L 1/22* (2013.01); *G01L 3/1457* (2013.01); *G01L 3/24* (2013.01); *G01L 5/136* (2013.01)

(58) Field of Classification Search
CPC ......... G01L 5/136; G01L 1/22; G01L 3/1457; G01L 3/24; B62M 6/50; B62M 3/16; B62J 45/40
USPC .................................................... 73/862.338
See application file for complete search history.

(56) References Cited

U.S. PATENT DOCUMENTS

| | | | |
|---|---|---|---|
| 5,016,478 | A | 5/1991 | Mercat |
| 5,027,303 | A | 6/1991 | Witte |
| 5,319,522 | A | 6/1994 | Mehta |
| 6,296,072 | B1 | 10/2001 | Turner |

(Continued)

FOREIGN PATENT DOCUMENTS

| | | |
|---|---|---|
| CN | 1724307 A | 1/2006 |
| CN | 101201284 A | 6/2008 |

(Continued)

OTHER PUBLICATIONS

Italian Search Report and Written Opinion in Italian Application No. 102018000005294, dated Jan. 15, 2019, with English translation.

(Continued)

*Primary Examiner* — Octavia Davis Hollington
(74) *Attorney, Agent, or Firm* — Volpe Koenig

(57) ABSTRACT

A bicycle crankarm the bicycle transmission side that has a main body length measured along a length from a crankset's crankarm rotation axis to a pedal axis. The crankarm has at least one stress/strain detector oriented along the length direction at a fixed distance, measured from the center of the stress/strain detector to the rotation axis of the crankarm, such that the ratio of the distance and the length is in the range between 0.45-0.65.

18 Claims, 9 Drawing Sheets

(56) References Cited

U.S. PATENT DOCUMENTS

| | | |
|---|---|---|
| 6,321,734 B1 | 11/2001 | Kaminaga et al. |
| 7,647,837 B2 | 1/2010 | Moran et al. |
| 7,806,006 B2* | 10/2010 | Phillips ............... G01L 3/1457 73/862.338 |
| 8,006,574 B2 | 8/2011 | Meyer |
| 8,065,926 B2 | 11/2011 | Meyer |
| 8,096,173 B2 | 1/2012 | Isono |
| 8,800,389 B2 | 8/2014 | Tetsuka |
| 8,852,130 B2 | 10/2014 | Govari |
| 8,881,608 B2 | 11/2014 | Tetsuka |
| 9,097,598 B2 | 8/2015 | Grassi |
| 9,182,304 B2* | 11/2015 | Namiki ............... G01L 3/24 |
| 9,221,440 B2 | 12/2015 | Drennen |
| 9,254,588 B1 | 2/2016 | Chao et al. |
| 9,310,264 B2 | 4/2016 | David |
| 9,322,725 B2 | 4/2016 | Tetsuka |
| 9,423,310 B2 | 8/2016 | Tetsuka |
| 9,459,167 B2 | 10/2016 | Heinkel et al. |
| 9,476,294 B2 | 10/2016 | Harman |
| 9,488,668 B2 | 11/2016 | Bailey et al. |
| 9,551,623 B2 | 1/2017 | Beirmann |
| 9,581,508 B2 | 2/2017 | Tetsuka |
| 9,599,526 B2 | 3/2017 | Mercat |
| 9,784,628 B1 | 10/2017 | Jennings et al. |
| 9,810,593 B2 | 11/2017 | Carrasco |
| 9,829,402 B2 | 11/2017 | Beason et al. |
| 9,969,451 B2 | 5/2018 | Sasaki |
| 10,000,253 B1 | 6/2018 | Tetsuka |
| 10,076,681 B2 | 9/2018 | Lull |
| 10,286,978 B1 | 5/2019 | Chen |
| 10,591,371 B2 | 3/2020 | D'Elia |
| 2003/0093173 A1 | 5/2003 | Farnworth et al. |
| 2003/0137046 A1 | 7/2003 | Kageyama |
| 2005/0145061 A1 | 7/2005 | Ording et al. |
| 2005/0199092 A1 | 9/2005 | Feltrin et al. |
| 2007/0186719 A1 | 8/2007 | Ciavatta et al. |
| 2007/0199403 A1 | 8/2007 | Ciavatta et al. |
| 2008/0236293 A1 | 10/2008 | Meggiolan |
| 2008/0257056 A1 | 10/2008 | Smetana |
| 2008/0314193 A1 | 12/2008 | Meggiolan |
| 2009/0119032 A1 | 5/2009 | Meyer |
| 2009/0120210 A1 | 5/2009 | Phillips et al. |
| 2010/0162830 A1 | 7/2010 | Meuter |
| 2010/0220963 A1 | 9/2010 | Tamura et al. |
| 2010/0242273 A1 | 9/2010 | Sugimoto et al. |
| 2010/0263468 A1 | 10/2010 | Fisher et al. |
| 2011/0135474 A1 | 6/2011 | Thulke |
| 2012/0169154 A1 | 7/2012 | Curodeau |
| 2012/0214646 A1 | 8/2012 | Lull et al. |
| 2012/0330572 A1 | 12/2012 | Longman |
| 2013/0205916 A1 | 8/2013 | Kodama et al. |
| 2013/0283969 A1 | 10/2013 | Watarai |
| 2013/0333489 A1 | 12/2013 | David et al. |
| 2014/0060212 A1 | 3/2014 | Tetsuka et al. |
| 2014/0200835 A1 | 7/2014 | Carrasco Vergara |
| 2015/0239499 A1 | 8/2015 | Lan et al. |
| 2015/0247767 A1 | 9/2015 | Tetsuka |
| 2016/0003696 A1 | 1/2016 | Longman et al. |
| 2016/0031523 A1 | 2/2016 | Tetsuka et al. |
| 2016/0052583 A1 | 2/2016 | Sasaki |
| 2016/0295702 A1 | 10/2016 | Heikkinen et al. |
| 2016/0311491 A1 | 10/2016 | Watarai |
| 2017/0127581 A1 | 5/2017 | Figueredo et al. |
| 2017/0176275 A1 | 6/2017 | Tetsuka et al. |
| 2017/0232674 A1 | 8/2017 | Mark |
| 2017/0247078 A1 | 8/2017 | Tetsuka |
| 2017/0248420 A1 | 8/2017 | Fyfe et al. |
| 2017/0271722 A1 | 9/2017 | Ehm et al. |
| 2017/0356816 A1 | 12/2017 | D'Elia et al. |
| 2018/0011122 A1 | 1/2018 | Nichols et al. |
| 2018/0290714 A1 | 10/2018 | Fossato et al. |
| 2019/0099119 A1 | 4/2019 | Wakeham |

FOREIGN PATENT DOCUMENTS

| | | |
|---|---|---|
| CN | 101290026 A | 10/2008 |
| CN | 101327828 A | 12/2008 |
| CN | 201201674 Y | 3/2009 |
| CN | 201707167 U | 1/2011 |
| CN | 102589772 A | 7/2012 |
| CN | 103612702 A | 3/2014 |
| CN | 103674384 A | 3/2014 |
| CN | 204527067 U | 8/2015 |
| CN | 205156906 U | 4/2016 |
| CN | 106003753 A | 10/2016 |
| CN | 106335591 A | 1/2017 |
| CN | 106965901 A | 7/2017 |
| CN | 107290086 A | 10/2017 |
| CN | 107585252 A | 1/2018 |
| CN | 207019821 U | 2/2018 |
| EP | 1 486 413 A2 | 12/2004 |
| EP | 1 818 252 A1 | 8/2007 |
| EP | 1 978 342 A2 | 10/2008 |
| EP | 1 407 239 B1 | 1/2009 |
| EP | 2 058 637 A2 | 5/2009 |
| EP | 2805141 B1 | 11/2014 |
| JP | H08145824 A | 6/1996 |
| TW | 201307145 A | 2/2013 |
| WO | 2011/030215 A1 | 3/2011 |
| WO | 2014/004381 A1 | 1/2014 |
| WO | 2015/095933 A1 | 7/2015 |
| WO | 2016/030859 A1 | 3/2016 |
| WO | 2017/165448 A1 | 9/2017 |

OTHER PUBLICATIONS

Italian Search Report and Written Opinion in Italian Application No. 102018000005297, dated Mar. 4, 2019, with English translation.
Italian Search Report and Written Opinion in Italian Application No. 102018000005299, dated Jan. 21, 2019, with English translation.
Italian Search Report and Written Opinion in Italian Application No. 102018000005302, dated Jan. 23, 2019, with English translation.
Italian Search Report and Written Opinion in Italian Application No. 102018000007266, dated Mar. 22, 2019, with English translation.
Ron/Spinningmagnets; "Electric bicycles are adopting a new standard for connectors: electricbike.com"; published on Dec. 6, 2013. Retrieved from the Internet: URL: https://www.electricbike.com/ropdenergybus-charging-port-standard/ (accessed on May 3, 2019).
Chinese Office Acton for Application No. 201910388492.9, dated Jan. 12, 2022. English translation attached.
Chinese Office Acton for Application No. 201910389220.0, dated Jan. 21, 2022. English translation attached.
Chinese Office Action for Application No. 201910389220.0, dated Aug. 11, 2021, with English translation.
Chinese Office Action for Application No. 201910388132.9, dated Aug. 17, 2021, with English translation.
Chinese Office Action for Chinese Application No. 201910388132.9, dated Mar. 28, 2022. English translation attached.

* cited by examiner

BICYCLE CRANKARM HAVING A STRESS/STRAIN DETECTOR FOR A TORQUE METER OR A POWER METER, AND METHODS FOR MANUFACTURING AND USING THE CRANKARM

CROSS REFERENCE TO RELATED APPLICATION

This application claims the benefit of Italian Application No. 102018000005302, filed on May 11, 2018, which is incorporated herein by reference as if fully set forth.

FIELD OF INVENTION

The invention relates to a bicycle crankarm provided with a stress/strain detector for a torque or power meter. More in particular, the invention relates to a crankarm on the transmission side, typically a right crankarm. The invention also relates to methods related to manufacturing and using such a bicycle crankarm.

BACKGROUND

The general knowledge in the field of the detection of stresses in a bar, as typically used in the context of the measurement of the torque applied to a crankarm of a crankset of a bicycle, typically provides for the use of at least one strain gage, typically of two strain gages, one positioned on one side with respect to the neutral plane of the crankarm with respect to the useful component of the pedaling force, and the other positioned on the opposite side with respect to the neutral plane.

It is also known in general to provide, in each measuring position, for a further strain gage the tracks of which are oriented parallel with respect to the tracks of the active strain gage, the role of this parallel strain gage being that of increasing the precision of the measurement reading; or a further strain gage the tracks of which are oriented at 90° with respect to the tracks of the active strain gage, the role of this orthogonal strain gage being that of compensating for the changes in resistance in the active strain gage caused by changes in temperature and/or that of increasing the precision of the measurement reading, by detecting the elongations/shortenings due to the Poisson effect.

A reading device, typically comprising a Wheatstone bridge circuit, takes care of reading the outputs of the strain gage or of the strain gages, suitably combining them.

U.S. Pat. No. 9,459,167 B2 discloses a crankarm with power meter, comprising at least one detector, in particular a strain gage, layered together with the composite material forming the crankarm.

Such a document teaches to make the detector so that it extends substantially along the entire length of the crankarm, deeming that in this way the measurement range increases.

According to such a document, it is possible to arrange the detector parallel to the top face and to the bottom face of the crankarm and therefore in a plane oriented orthogonally to the rotation plane of the crankarm, or parallel to the front and rear face of the crankarm and therefore in a plane oriented parallel to the rotation plane of the crankarm. It is also possible to provide for different detectors in the same and/or in different orientations.

The Applicant observes that the reading of a detector of large size and extending for a substantial part of the length of the crankarm, like that of such a document, is greatly affected by changes in shape and/or material along the crankarm itself, which are in fact averaged by the detector in such a manner as to possibly give an inaccurate or unreliable reading as a result.

According to EP1978342A2, preferably the position of the strain gages of an instrument-equipped right crankarm is closer to the pivot shaft (bottom bracket spindle) than to the pedal.

The Applicant has verified that the output signal of a stress/strain detector applied to a right crankarm is indeed maximum when the detector is close to the bottom bracket spindle; however, it has recognized that by following such a teaching, the detector does not sufficiently accurately detect the pedaling power or torque component that is applied specifically to the right crankarm.

The technical problem at the basis of the invention is to provide a crankarm on the transmission side, provided with a stress/strain detector for a power meter or a torque meter, which allows a particularly accurate detection of the torque or pedaling power.

SUMMARY

A bicycle crankarm, particularly for the bicycle transmission side, has a main body with a length between the rotation axis of the chainring and the pedal axis and a stress/strain detector that is oriented along the length direction between the axes. The bicycle crankarm is particularly useful for accurately detecting a rider's torque or pedal power.

BRIEF DESCRIPTION OF THE DRAWINGS

Further features and advantages of the invention will be more clearly apparent from the description of preferred embodiments thereof, made with reference to the attached drawings, in which.

DETAILED DESCRIPTION OF THE PREFERRED EMBODIMENTS

Figure 1:
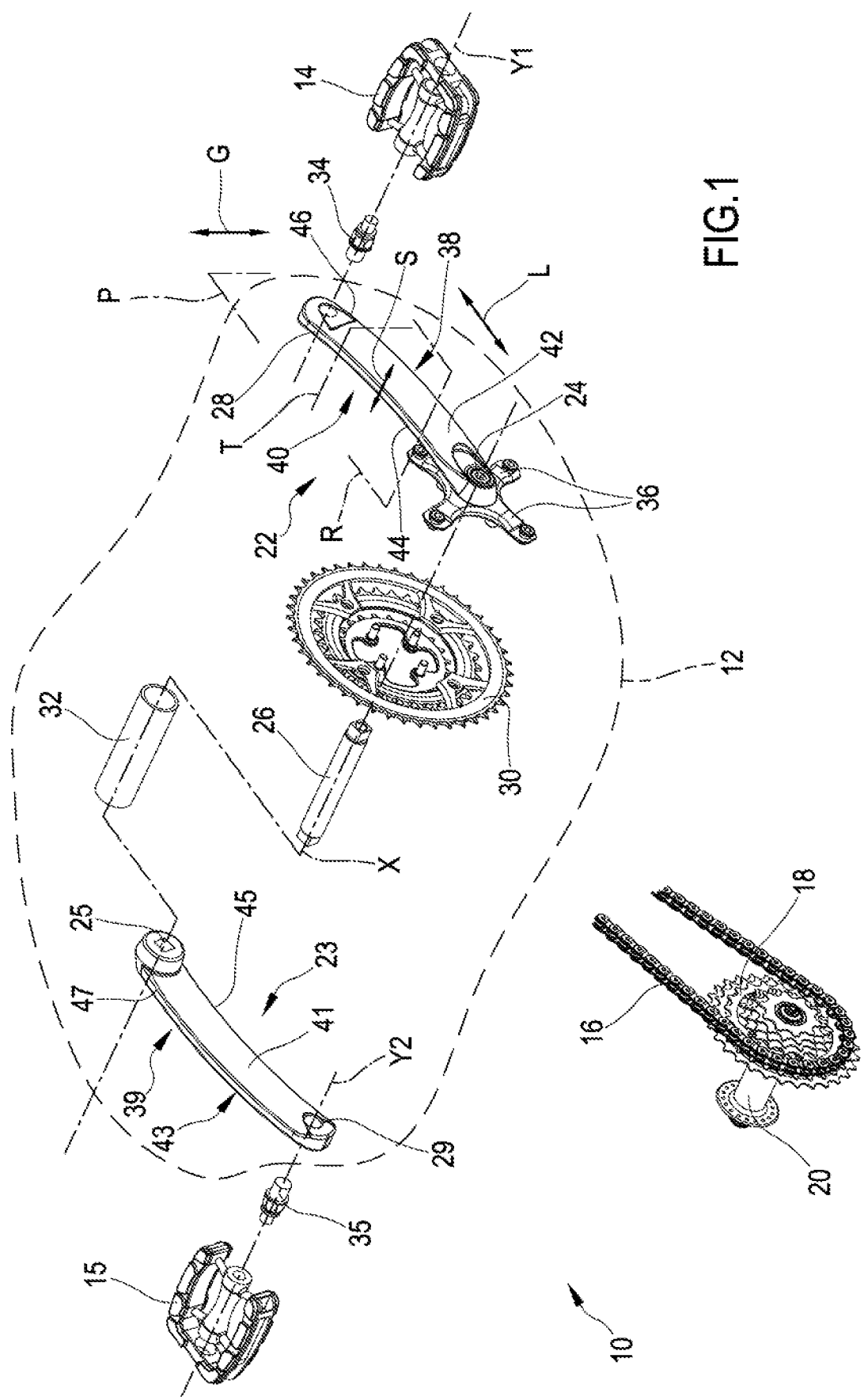
FIG. 1 schematically illustrates a bicycle transmission.

For the sake of brevity the expression "on the transmission side" hereinafter will sometimes be simplified by the specific term "on the chain side" and sometimes further simplified by the specific term "right", a belt transmission and also a left crankarm in the case of atypical mounting of the transmission being anyway meant to be encompassed. Similarly, the expression "on the side opposite to the transmission side" will sometimes be simplified to "on the side opposite to the chain side" and sometimes further simplified by the specific term "left", a belt transmission and also a right crankarm in the case of atypical mounting of the transmission being anyway meant to be encompassed.

In the present description and in the attached claims, under "torque meter", an instrument for detecting the torque delivered by the cyclist is meant to be indicated; under "power meter", an instrument for detecting pedaling power is meant to be indicated. A processor external to a torque meter can obtain power measurements by combining the output of such a torque meter with the output of an (angular) speed measuring device.

In the present description and in the attached claims, as well as in general in the mechanical field, under the term "neutral axis" it is meant to indicate the geometric locus of the points in which the stresses normal to the cross section of the solid—in this case the crankarm—under consideration are zero. Under the term "neutral plane" it is meant to indicate the geometric locus of the points belonging to the neutral axis of every cross section, which in practice can also diverge from a geometric plane.

Considering the crankarm with the pedal axis in front position (in the travel direction) with respect to the rotation axis, and therefore in the "downstroke" (the most effective part of the pedaling cycle), the strain gage that is in top position is subjected to and detects a dilation or elongation, while the strain gage that is in bottom position detects a contraction or compression when the cyclist applies a force on the pedal.

In an aspect the invention relates to a bicycle crankarm, said crankarm being configured for mounting on the bicycle transmission side, and comprising a main body having a length measured along a length direction from a rotation axis to a pedal axis of the crankarm, said crankarm comprising at least one stress/strain detector for a torque meter or a power meter, oriented along the length direction, characterized in that said at least one detector is fixed at a distance, measured from the center of said stress/strain detector to the rotation axis of the crankarm, such that the ratio between said distance and said length is comprised in the range 0.45-0.65.

In the present description and in the following claims, all of the numerical magnitudes indicating quantities, parameters, percentages, and so on should in all circumstances be deemed to be preceded by term "about", unless otherwise indicated. Furthermore, all of the ranges of numerical magnitudes include all of the possible combinations of maximum and minimum numerical values and all of the possible intermediate ranges, besides those specifically indicated hereinafter.

Although reference is made, in the aforementioned ratio, to the distance from the rotation axis, alternatively it is possible to use the distance from the pedal axis, the sum of such two distances indeed being equal to the aforementioned length of the crankarm. Referring to this alternative distance, the values of the ratio would be 1 minus the values indicated above (0.35-0.55).

With such a provision, said at least one stress/strain detector is advantageously fixed to the main body in a position, along the length direction, at which a sensitivity ratio between the sensitivity of the detector to stresses/strains originating from forces/torques applied to the crankarm at the pedal axis and the sensitivity of the detector to stresses/strains originating from forces/torques applied to the crankarm at the rotation axis is maximized, in particular it is at least 90% of a maximum value of such a sensitivity ratio along the length.

Under "stresses/strains originating from forces/torques applied to the crankarm at the pedal axis, respectively at the rotation axis", what happens inside the crankarm is meant to be indicated: the force/torque is in fact applied by the cyclist elsewhere (on the right pedal, respectively the left pedal), however once it arrives at the crankarm, such a force/torque arrives at the pedal axis, respectively at the rotation axis.

The Applicant has indeed perceived that, in the mounted crankset, wherein the crankarm on the transmission side (e.g. right) is coupled with a crankarm on the side opposite to the transmission side (e.g. left) through the so-called bottom bracket spindle, the detector detects not only the stresses/strains due in particular to the application of the pedaling force on the pedal of the crankarm itself (the right one in the example), which is what it is wished to be detected, rather also stresses/strains due to forces/torques applied on the other crankarm (the left one in the example) and due in particular to the application of the pedaling force on the other pedal, which is transmitted to the transmission belt or chain through the bottom bracket spindle and the crankarm of interest herein, on the transmission side (the right one in the example). The Applicant has further recognized that, although the maximization of the sensitivity of the detector to the first stresses/strains is indeed sacrificed, the particular choice of values for the aforementioned distance/length ratio leads to better results in terms of accuracy of the torque or power detection, in particular maximizing the sensitivity ratio.

In the present description and in the attached claims, under "sensitivity of the detector", the size of the output signal of the detector, or of a reading circuit thereof, per unit force is meant to be indicated.

Preferably, said ratio is comprised in the range 0.48-0.62.

More preferably, said ratio is comprised in the range 0.50-0.60.

Even more preferably, said ratio is comprised in the range 0.52-0.58.

Preferably, the crankarm is made at least in part of composite material comprising structural fiber incorporated in a polymeric matrix.

Preferably the structural fiber is selected from the group consisting of carbon fibers, glass fibers, boron fibers, synthetic fibers, ceramic fibers and combinations thereof.

Preferably, the synthetic fibers comprise polyoxazole fibers, for example Zylon®, ultra high molecular weight polyethylene fibers, for example Dyneema®, aramid fibers, for example kevlar fibers and combinations thereof.

Said at least one detector can be integrated in said crankarm.

In the present description and in the attached claims, under "integrated", that the crankarm is molded, as a single piece, with said at least one detector already inserted inside it is meant to be indicated.

Alternatively, said at least one detector can be positioned on a first face of the crankarm, and the crankarm can comprise at least one second detector arranged on a second face of the crankarm opposite said first face.

Preferably, in the evaluation of the aforementioned sensitivity ratio, the sensitivity of the detector to stresses/strains originating from forces/torques applied to the crankarm at the pedal axis is defined by the output signal of said at least one detector in a first setting condition in which only a force/torque at the pedal axis is applied, and the sensitivity of the detector to stresses/strains originating from forces/torques applied to the crankarm at the rotation axis is defined by the output signal of said at least one detector in a second setting condition in which only a force/torque at the rotation axis is applied.

Here and hereinafter, the expression setting condition is meant to also encompass a calibration condition and a design condition.

Preferably, in said position in which said at least one detector is fixed, the sensitivity ratio is equal to or greater than 20:1.

Preferably, the stress/strain detector is a detector of bending moment/bending strain.

Preferably, said at least one stress/strain detector is at least one strain gage, more preferably an electrical resistance strain gage. In the present description and in the attached claims, the specific term "strain gage" is sometimes used, however those skilled in the art will understand that it can be a generic detector.

When the crankarm is made of composite material, preferably a length ratio between a length of the at least one strain gage and the length of the main body of the crankarm is equal to or greater than a minimum length ratio. The minimum length ratio is preferably equal to 1%, more preferably equal to 2%, even more preferably equal to 3%, even more preferably equal to 5.7%, even more preferably equal to 6%, even more preferably equal to 7%.

In the present description and in the attached claims, under "length of a strain gage" the operative length of its active part is meant to be indicated, in particular of the branches of its coil, disregarding possible connection or support elements.

With such minimum values of the length ratio, a reliable reading of the detector is obtained also in the presence of local inhomogeneity of the material of which the crankarm is made, as occurs in particular in the case of a crankarm made of composite material comprising structural fiber incorporated in a polymeric matrix.

Alternatively or additionally, when the crankarm is made of composite material, preferably, the length ratio between the length of the at least one strain gage and the length of the main body of the crankarm is less than or equal to a maximum length ratio. The maximum length ratio is preferably equal to 15%, more preferably equal to 13%, even more preferably equal to 11.6%, even more preferably equal to 9%, even more preferably equal to 8%, even more preferably equal to 7%.

With such maximum values of the length ratio, the aforementioned drawback—namely that the reading of the detector becomes greatly affected by changes in shape and/or material along the crankarm itself, which would in fact be averaged by the detector in such a manner as to lead to an inaccurate or unreliable reading—is avoided.

More preferably, the length ratio is selected, within the ranges defined by one of the minimum values and one of the maximum values indicated above, as a function of the characteristics of shape and material of the crankarm.

Such a length ratio is per se innovative and advantageously also applicable to strain gages applied to the crankarm on the side opposite to the transmission side, for which reason any bicycle crankarm, namely on the transmission side or on the side opposite to the transmission side, comprising a main body having a length measured along a length direction from a rotation axis to a pedal axis of the crankarm, and at least one stress/strain detector fixed at any position along the main body of the crankarm, said at least one detector comprising at least one strain gage, wherein a ratio between the length of the at least one strain gage and the length of the main body of the crankarm is equal to or greater than a minimum length ratio and/or is less than or equal to a maximum length ratio, said minimum and maximum length ratio having the values indicated above, should also be deemed per se an innovative aspect.

Preferably, a length ratio between a length of the at least one strain gage and the length of the main body of the crankarm is a function of the characteristics of shape and/or of material of the crankarm.

Preferably, the minimum length ratio is inversely proportional to an estimated homogeneity value of a material of which the crankarm is made.

Therefore, the minimum length ratio that ensures a good reading of the strain gage will be greater in the case of a crankarm made of a less homogeneous material (for example a composite material, comprising a polymeric matrix comprising structural fibers) than in the case of a crankarm made of a more homogeneous material (for example a metal alloy).

Preferably, the stress/strain detector comprises a pair of strain gages, one positioned on one side with respect to the neutral plane of the crankarm with respect to the useful component of the pedaling force (rotation plane) and the other one positioned on the opposite side with respect to the neutral plane.

Preferably, said at least one detector is oriented (namely it has its detection direction) according to a fiber direction of the composite material.

Preferably, said at least one detector is oriented in a plane parallel to the neutral plane with respect to a main stress/strain to be detected, but alternatively it can be oriented in a plane orthogonal to the neutral plane with respect to a main stress/strain to be detected or in a plane forming any angle with the neutral plane with respect to a main stress/strain to be detected.

Said at least one detector can be attached to an outer surface of the crankarm, irrespective of whether the crankarm is solid or hollow.

Alternatively, the crankarm can comprise at least one cavity (and a shell of composite material comprising structural fiber incorporated in a polymeric matrix, extending around said cavity) and said at least one detector can be attached to an inner surface of the cavity (inner surface of the shell).

Alternatively, the crankarm made of composite material can comprise a core (and a shell of composite material comprising structural fiber incorporated in a polymeric matrix, extending around said core), said at least one detector being arranged between the core and the composite material (between the core and the shell).

Preferably, said core comprises at least one recess, and said at least one detector is arranged in said at least one recess. In this way, its positioning is particularly precise.

Alternatively to the provision of a core or of a cavity, both faces of said at least one detector can be in contact with the composite material. In this case, the section of the crankarm is solid, at least in the region containing said at least one detector.

The invention can apply to a symmetrical detection system, comprising two sub-systems made at each crankarm of a crankset, or to a non-symmetrical detection system, comprising one sub-system at the crankarm on the transmission side and the other sub-system at the bottom bracket spindle, or furthermore to a detection system made at only the crankarm on the transmission side. In this last case, the torque or power delivered by the cyclist is estimated as double that measured.

In another aspect, the invention relates to a bicycle crankset comprising a bottom bracket spindle, a first crankarm on the transmission side as stated above, and a second crankarm on the side opposite to the transmission side.

In other aspects, the invention relates to a method for detecting the pedaling torque or power applied to a bicycle crankarm configured for mounting on a bicycle transmission side, and a process for manufacturing a crankarm configured for mounting on a bicycle transmission side, and provided with a stress/strain detector for a torque meter or a power meter.

Said method and process comprise the steps of:

a) providing a crankarm configured for mounting on the transmission side and comprising a main body having a length measured along a length direction extending from a rotation axis to a pedal axis of the crankarm, b) fixing at least one stress/strain detector for a torque meter or a power meter at a position, along the length direction, at which a sensitivity ratio between the sensitivity of the detector to stresses/strains originating from forces/torques applied to the crankarm at the pedal axis and the sensitivity of the detector to stresses/strains originating from forces/torques applied to the crankarm at the rotation axis is maximized, in particular it is at least 90% of a maximum value of such a sensitivity ratio along the length.

The considerations stated above with reference to the first aspect of the invention are valid for the aforementioned method and process, mutatis mutandis.

Preferably, the aforementioned method and process comprise determining such a position through the steps of:

c) determining a first curve representative of the change in the output signal of the at least one detector along said length in a first setting condition in which only a force/torque at the pedal axis is applied, d) determining a second curve representative of the change in the output signal of the at least one detector along said length in a second setting condition in which only a force/torque at the rotation axis is applied, e) determining a sensitivity-ratio curve representative of the change along said length of the ratio between the value of the first curve and the value of the second curve, f) determining the maximum value of the sensitivity-ratio curve, g) determining one or more available positions along said length in which said sensitivity-ratio curve is maximized, in particular greater than 90% of the maximum value determined in step f), h) choosing said position as one of the available positions.

In the present description, the expression "curve" is to be broadly understood to also encompass continuous and discontinuous lines and sets of distinct points, as well as straight lines and lines comprising rectilinear portions.

The steps of determining the first curve and the second curve can be carried out through modeling and simulation, however, especially in the case of a crankarm made of composite material, the mechanical properties of which are not easy to model, they are preferably carried out empirically.

The aforementioned method and process therefore preferably comprise the steps of:

i) defining a plurality of sampling positions distributed along the main body of the crankarm or of a nominally equal sample crankarm, j) fixing, at each of said sampling positions, said at least one detector sequentially, or a nominally equal sample detector, k) applying a predetermined and known first force/torque to the crankarm or sample crankarm at the pedal axis, and taking a reading of said at least one detector or sample detector while said at least one detector or sample detector is fixed at each sampling position, thereby acquiring a corresponding plurality of first readings, l) applying a predetermined and known second force/torque, preferably having the same intensity as the first force, to the crankarm or sample crankarm at the rotation axis, and taking a reading of said at least one detector or sample detector while said at least one detector or sample detector is fixed at each sampling position, thereby acquiring a corresponding plurality of second readings, wherein in said step c) the first curve is determined based on the plurality of first readings, and wherein in said step d) the second curve is determined based on the plurality of second readings.

Preferably, the aforementioned method and process comprise providing a plurality of sample crankarms nominally equal to the crankarm, and repeating steps j) to l) for each further sample crankarm acquiring additional first readings, respectively second readings, at each repetition.

Alternatively or additionally, the aforementioned method and process can also comprise repeating steps k) and l) applying a predetermined and known force/torque of different size, acquiring additional first readings, respectively second readings.

Preferably, in said step c) the first curve is determined based on the plurality of first readings through interpolation, preferably linear regression, and in said step d) the second curve is determined based on the plurality of second readings through interpolation, preferably regression.

The methodology adopted to determine one of the two curves could also be different from the methodology adopted to determine the other curve.

In another aspect, the invention relates to a method for detecting the pedaling torque or power applied to a bicycle crankarm configured for mounting on a bicycle transmission side, comprising the steps of:

a) providing a crankarm configured for mounting on the transmission side, and comprising a main body having a length measured along a length direction extending from a rotation axis to a pedal axis of the crankarm, b) fixing at least one stress/strain detector for a torque meter or a power meter at a distance, measured from the center of said stress/strain detector to the rotation axis of the crankarm, such that a ratio between said distance and said length is comprised in the range 0.45-0.65.

Preferred values of said range are as defined above with reference to the first aspect of the invention.

In another aspect, the invention relates to a process for manufacturing a bicycle crankarm made of composite material comprising structural fiber incorporated in a polymeric matrix, said crankarm being configured for mounting on the transmission side, the process comprising the steps, not necessarily sequential to each other, of:

providing a mold having a mold cavity having the shape of the crankarm, providing said at least one stress/strain detector for a torque meter or a power meter, providing a core of a predetermined shape, applying said at least one stress/strain detector on the core, inserting said core carrying said stress/strain detector into said mold cavity, inserting said composite material into said mold cavity, and subjecting to a temperature and pressure profile until hardening of the composite material, with the proviso that in said crankarm, said at least one stress/strain detector is fixed at a distance, measured from the center of said stress/strain detector to the rotation axis of the crankarm, such that the ratio between said distance and said length is comprised in the range 0.45-0.65.

Preferred values of said range are as defined above with reference to the first aspect of the invention.

A crankarm is thus created in which the composite material is in the form of a shell or cladding.

The core can stay in the molded crankarm, but preferably the core is made of low melting point material, and the process comprises the step, carried out once hardening has occurred, of making a hole in the crankarm, heating up to a temperature comprised between the melting point of the material of the core and the hardening point of the composite material, and letting the molten core come out from the hole.

Preferably, if the core is made of low melting point material, the process further comprises a step of washing the cavity left by the molten core with a chemical agent, provided that it does not damage said at least one detector.

Preferably, said core comprises at least one recess and in said step of applying said at least one detector on the core, said at least one detector is applied in said recess. This provision prevents the detector from moving during the molding process.

A core with one or more recesses in which to apply at least one detector is a per se useful provision and represents a per se innovative aspect, irrespective of the ratio between the distance measured from the center of the detector to the rotation axis and the length of the crankarm, respectively irrespective of the relationship between the position of the detector and the sensitivity ratio and/or irrespective of the size of the detector with respect to the length of the crankarm.

In the aspects of crankarm, crankset, method and process outlined above, preferably the crankarm is configured for mounting on the transmission side through a plurality of spider legs that extend radially at the pivot end of the crankarm, one or more chainrings for a transmission belt or chain being provided or fixed at the plurality of spider legs.

In the aspects of crankarm, crankset, method and process outlined above, preferably said at least one stress/strain detector is irremovably fixed to the main body of the crankarm in said position in which the ratio between the distance measured from the center of the detector to the rotation axis and the length of the crankarm falls within the range indicated above, respectively in said position in which the sensitivity ratio is greater than the indicated percentage.

In the method and in the process outlined above, as well as in the aspects of crankarm and of crankset outlined above, preferably the positioning of said at least one detector in the direction transversal to the crankarm can be whatever, both on the outer surface of the crankarm and inside the cross section delimited by such an outer surface. In greater detail, the at least one stress/strain detector can be applied to an outer surface of the crankarm, to an inner surface of the crankarm, namely exposed in an inner cavity of the crankarm and/or be incorporated in the material of the crankarm, in particular it can be co-molded with the composite material itself in the case of a crankarm made of composite material.

FIG. 1 shows a bicycle transmission.

A bicycle transmission 10 is a mechanism that converts the motion applied by the cyclist into rotary motion used to move the rear wheel.

A crankset 12 is the component of the transmission 10 of a bicycle that converts the motion applied to the pedals 14, 15 by the cyclist into rotary motion used to move the transmission chain 16 (in other cases, the belt), which in turn moves the rear wheel.

Besides the crankset 12, the transmission 10 further comprises the pedals 14, 15, the aforementioned chain 16 (or belt), and one or more sprockets 18 at the hub 20 of the rear wheel.

It should be emphasized that slightly different terminology from that used here is also in use; for example the pedals 14, 15 can be considered part of the crankset.

The crankset 12 comprises in general two crankarms 22, 23, each having a pivot end 24, 25 configured for coupling with a bottom bracket spindle 26 or axle of the crankarms 22, 23, and a free end 28, 29, opposite the pivot end 24, 25, configured for coupling with the pedal 14, 15; as well as at least one chainring 30 (three being shown as an example) fixed to the crankarm 22 on the chain side, integrally rotating (rotating as a unit) therewith.

Typically, the motion transmission 10 is mounted on the bicycle with the transmission chain 16 (and the chainring(s) 30 of the crankset 12 and the sprocket(s) 18 at the hub 20 of the rear wheel) on the right side; less often it is mounted with transmission chain 16, chainring(s) 30 and sprocket(s) 18 arranged on the left side of the bicycle.

For the sake of brevity the expression "on the transmission side" will sometimes be simplified hereinafter by the specific term "on the chain side" and sometimes further simplified by the specific term "right", in any case also a belt transmission and also a left crankarm in the case of an atypical mounting of the transmission being meant to be encompassed. Similarly, the expression "on the side opposite to the transmission side" will sometimes be simplified to "on the side opposite to the chain side" and sometimes further simplified by the specific term "left", in any case also a belt transmission and also a right crankarm in the case of an atypical mounting of the transmission meant to be encompassed.

A component called bottom bracket 32 allows the rotation of the bottom bracket spindle 26 itself with respect to the bicycle frame in at least one direction; namely, the bottom bracket 32 forms the connection element of the crankset 12 to the frame.

The axis of the bottom bracket spindle 26 is also indicated hereinafter as rotation axis X, and is horizontal in the normal travel condition of the bicycle, in leveled rectilinear motion.

In the bottom bracket 32, the spindle 26 is rotationally supported about the rotation axis X through suitable bearings.

For the connection of each pedal 14, 15 to the respective crankarm 22, 23, suitable pivotal connection means are provided that allow the pedal 14, 15 to freely rotate around an axis called pedal axis Y1, Y2 herein, which in turn rotates about the rotation axis X with the crankarm 22, 23.

The connection between crankarm 22, 23 and respective pedal 14, 15 is typically of the pin/hole type or of another type that preferably allows the rotation of the pedal 14, 15 around the axis Y1, Y2 with respect to the crankarm 22, 23. The pedal pivot 34, 35 can be fixedly connected to the free end 28, 29 of the crankarm 22, 23 and the hole can be made in the pedal 14, 15. Alternatively, the pedal pivot 34, 35 can be fixedly connected to the pedal 14, 15 and the hole can be made at the free end 28, 29 of the crankarm 22, 23. As a further alternative, it is possible to provide for two holes, at the free end 28, 29 of the crankarm 22, 23 and on the pedal 14, 15, suitable for receiving a bolt or a screw.

The connection between crankarm 22, 23 and a respective axially outer end of the bottom bracket spindle 26 is of a type that makes them integrally rotate (rotate as a unit), and prevents the axial sliding of the crankarms 22, 23 with respect to the spindle 26.

A crankarm 22, 23 can be made as a single piece with the spindle 26, the other crankarm 23, 22 being coupled to the other end of the spindle 26 after the insertion of the latter in the bottom bracket 32. Alternatively, each crankarm 22, 23 can be made as a single piece with a respective spindle element, the two spindle elements being connected to one another end-to-end. As a further alternative, both crankarms 22, 23 can be coupled to a spindle 26 not in one piece.

For one or both of the crankarms 22, 23 there can for example be a screw matching, a force fitting, in particular through splined fitting, a square pin and hole matching, a gluing, or a welding.

The (typically right) crankarm 22 on the chain side 16 comprises means for fixing said chainrings 30 intended to engage, one at a time, with the chain 16. Typically, a plurality of spider legs 36 are provided for (indicated as a whole as spider), that extend radially, at the pivot end 24 of the right crankarm 22, typically as one piece with the crankarm 22; at the free ends of the spider legs 36, the chainring(s) 30 is(are) typically screwed in. Alternatively, the chainrings 30 can be made as a single piece with the right crankarm 22.

The main body or "arm region" 38, 39 of each crankarm 22, 23, namely a portion thereof extending between the rotation axis X and the pedal axis Y1, Y2 and therefore disregarding the aforementioned spider 36, is generically shaped like a bar (or rectangular parallelepiped) extending orthogonal (and cantilevered) to the rotation axis X. For the sake of brevity, hereinafter the expression "crankarm" will sometimes be used, meaning in particular the bar-shaped main body 38, 39 thereof.

More in particular, the main body 38, 39 of the crankarm 22, 23 extends in a generically radial direction with respect to the rotation axis X—under generically it being meant that it can also deviate, in one or more points as well as along the entire extension thereof, from such a direction. Each crankarm 22, 23 can indeed be more or less tapered/countersunk, when seen along a direction parallel to the rotation axis X, and/or more or less angled when seen along a direction orthogonal to the rotation axis X.

In the present description and in the attached claims, under rotation plane P of the crankarm 22, 23, any plane orthogonal to the pedal axis Y1, Y2 and to the rotation axis X is meant to be indicated, in particular one of the median planes of the crankarm 22, 23.

In the present description and in the attached claims, under rotary plane R of the crankarm 22, 23 or axes plane, the plane containing the rotation axis X and the pedal axis Y1, Y2 is meant to be indicated. In particular, under rotary plane R, one of the median planes of the crankarm 22, 23 is meant to be indicated.

With reference to such a schematization of the crankarm 22, 23 as a bar, in the present description and in the attached claims, under length direction L of the crankarm 22, 23, a direction orthogonally joining the rotation axis X to the pedal axis Y1, Y2 is meant to be indicated; the length direction L lies in particular in the rotary plane R.

In the present description and in the attached claims, under transversal plane T to the crankarm 22, 23, any plane orthogonal to the length direction L is meant to be indicated. In particular, under transversal plane T, one of the median planes of the crankarm 22, 23 is meant to be indicated.

In the present description and in the attached claims, under cross section of the crankarm 22, 23, a section taken through the main body 38, 39 of the crankarm 22, 23 in a transversal plane T is meant to be indicated. The cross section of each crankarm 22, 23 (in the arm region 38 for the right crankarm 22) is generically rectangular, but it can be of any type, although it typically has at least one axis of symmetry. The shape and size of such a cross section can be constant along the entire length of the crankarm 22, 23 or they can change. The cross section of each crankarm 22, 23 can be solid or hollow.

In the present description and in the attached claims, under width direction G of the crankarm 22, 23, a direction lying in the rotation plane P and orthogonal to the length direction L of the crankarm 22, 23 is meant to be indicated; the width direction G lies in a transversal plane T.

In the present description and in the attached claims, under thickness direction S of the crankarm 22, 23, a direction parallel to the rotation axis X is meant to be indicated; the thickness direction S lies in a transversal plane T and in the rotation plane R.

For the sake of clarity, in FIG. 1 these planes and these directions are only shown on the right crankarm 22.

In the present description and in the attached claims, under proximal face 40, 41 of the crankarm 22, 23, the face that, in the mounted condition, faces towards the frame is meant to be indicated; under distal face 42, 43 of the crankarm 22, 23, the face opposite the proximal face 40, 41 is meant to be indicated. The bottom bracket spindle 26 extends from the proximal face 40, 41, and the pedal pivot 34, 35 extends from the distal face 42, 43.

In the present description and in the attached claims, under upper face 44, 45 and lower face 46, 47, respectively, of the crankarm 22, 23, the faces substantially orthogonal to the proximal face 40, 41 and to the distal face 42, 43 are meant to be indicated, extending along the length direction L and the thickness direction S, which are located in upper and lower position, respectively, when the crankarm 22, 23 is in the downstroke, namely with the free end 28, 29 forwards in the travel direction with respect to the pivot end 24, 25.

In the present description and in the attached claims, in the case of a hollow crankarm 22, 23 (at least along the arm region or main body 38, 39 thereof), under inner surface of the crankarm 22, 23, the surface facing towards the cavity is meant to be indicated; under outer surface of the crankarm 22, 23, the exposed surface is meant to be indicated.

During pedaling, the force applied by the cyclist on the pedals 14, 15 is transferred from the latter to the crankarms 22, 23.

The left crankarm 23 transfers such a force to the bottom bracket spindle 26. The bottom bracket spindle 26 transfers such a force—apart from the losses by friction with the bottom bracket 32—to the right crankarm 22.

The force directly applied to the right crankarm 22 or transmitted thereto by the left crankarm 23 as stated above is transferred to the spider 36 of the right crankarm 22, and therefrom to the chainrings 30.

From the chainrings 30, the force is transmitted to the transmission chain 16, and therefrom to the cogset 18 that, finally, transfers it to the hub 20 of the rear wheel, through the free wheel body of the cogset 18, if present.

In each of the aforementioned components of the transmission 10 stresses and corresponding strains are therefore generated, which can be a more or less accurate indication of the force delivered by the cyclist.

More in particular, pedaling is a cyclical movement with which the cyclist applies, with each leg on the respective pedal 14, 15, such a force as to set the crankset 12 into rotation, consequently moving the rear wheel through the chain 16 and the cogset 18.

During pedaling, the force (F in FIG. 2) applied on the pedals 14, 15 by the cyclist changes in terms both of intensity and of direction as a function of the angular position in which the crankarms 22, 23 are located, and causes a state of stress and a consequent state of strain in the components of the crankset 12.

Hereinafter, with reference to FIG. 2, the right crankarm 22 is considered, it being understood that what will be described is valid in part also for a left crankarm 23, the differences of importance herein being emphasized.

In order to evaluate the stresses and strains of the crankarm 22 due to the application of the force F to the respective pedal 14 in a predetermined angular position of the crankarm 22, the crankarm 22 may be deemed to be a beam constrained at its pivot end 24 (on the left in FIG. 2), and the pedal 14 as an element constrained at the free end 28 of the crankarm 22 (on the right in FIG. 2), namely as if the pedal 14 could not rotate with respect to the crankarm 22 and the crankset 12 could not rotate with respect to the bottom bracket 32.

The point of application of the force F can be deemed to correspond with the center O of the surface of the pedal 14 in contact with the foot of the cyclist.

Figure 2:
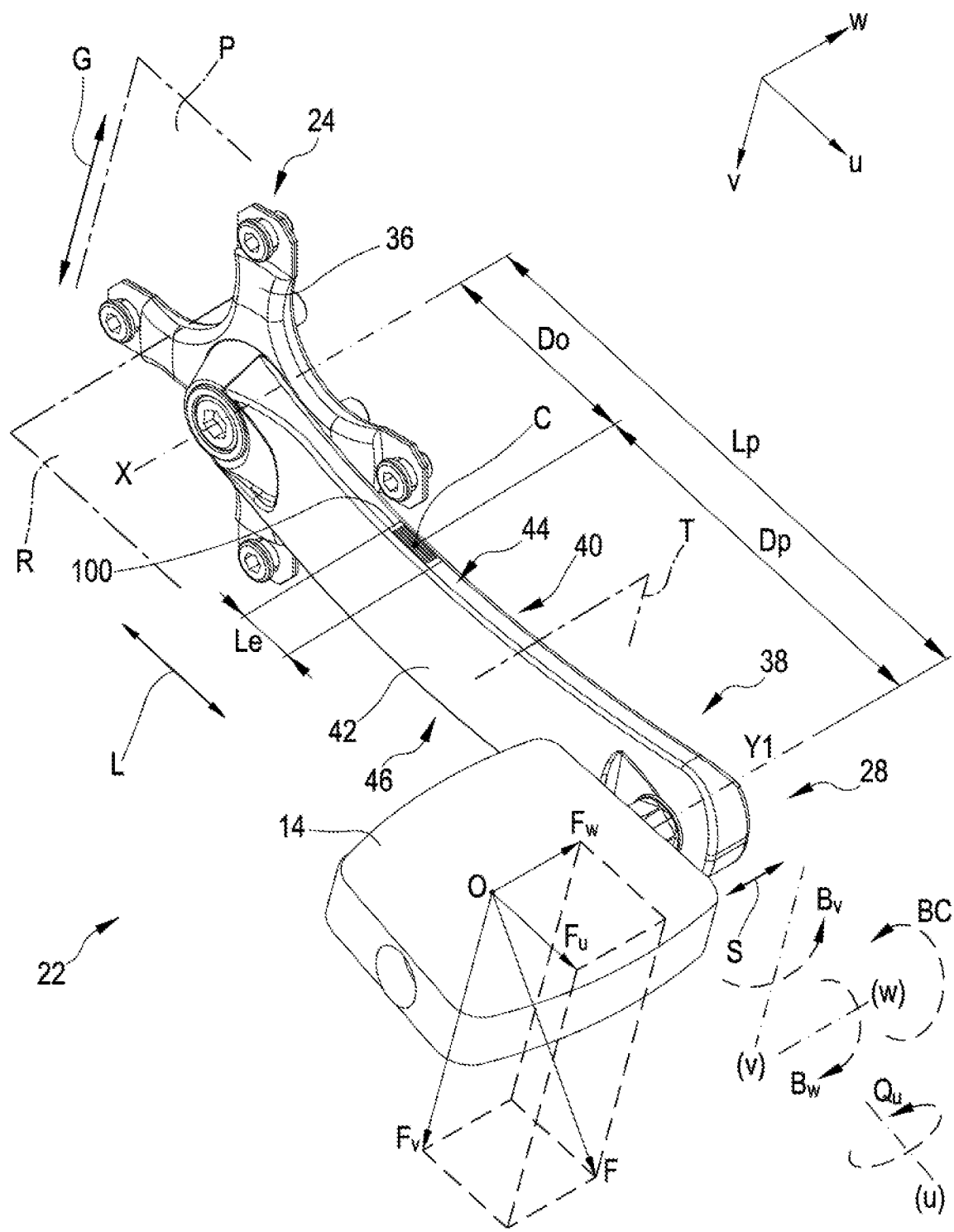
FIG. 2 is a perspective view of a crankarm with some annotated reference systems.

Considering a generic reference system UVW, wherein the direction U coincides with the length direction L of the crankarm 22, 23 and the direction W is parallel to or coincides with the rotation axis X and with the thickness direction S, and taking the positive directions as arbitrarily shown in FIG. 2, the force F can be generically decomposed into the following components:

a radial or parallel component Fu acting along the length direction L of the crankarm 22, 23, a tangential or perpendicular component Fv, orthogonal to the axes plane or rotary plane R, a lateral component Fw, orthogonal to the rotation plane P of the crankarm 22, and parallel to the rotation axis X and to the pedal axis Y1.

As stated above, the magnitude and the direction of the force F change during pedaling for various reasons, and at any moment, one or more of the components Fu, Fv, Fw could also be oriented in the opposite direction to the one shown.

The tangential or perpendicular component Fv represents the only effective component or useful component for the purposes of pedaling, i.e. that which actually sets the crankarm 22 into rotation.

It should be noted that the tangential or perpendicular component Fv is at maximum magnitude when the crankarm 22 is in such an angular position that the pedal axis Y1 is forward with respect to the rotation axis X in the travel direction; such a phase is called thrusting or propulsion phase and takes place alternately for each crankarm 22, 23. The tangential component Fv causes a bending moment Bw around axis W, which results in a first bending strain, still indicated with Bw.

Figure 3:
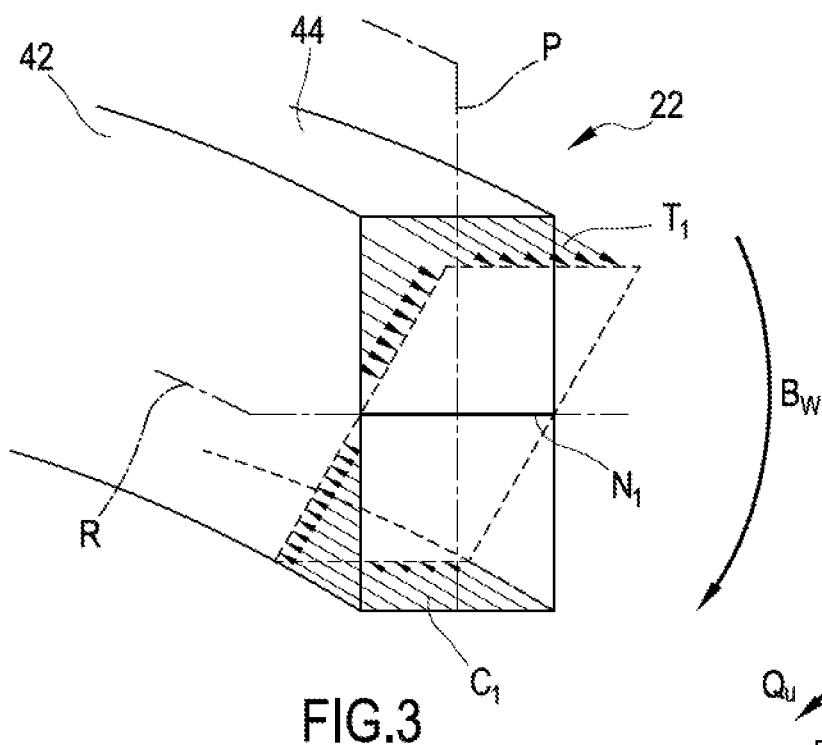
FIGS. 3-5 are schematic illustrations of stresses acting on a cross section of the crankarm.

In greater detail and in a per se well known manner, the bending strain Bw comprises a tensile strain or dilation T1 on one side with respect to the axes plane R (at the top in FIG. 3) and a compressive strain or contraction C1 on the other side of the crankarm 22, 23 with respect to the axes plane R (at the bottom in FIG. 3).

In any cross section of the crankarm 22 it is possible to identify a neutral axis N1 for the bending moment Bw.

As already indicated above, in the present description and in the attached claims, as well as in general in the mechanical field, under "neutral axis" the geometric locus of the points at which the stresses normal to the cross section of the solid—in this case the crankarm 22, 23—under consideration are zero is meant to be indicated.

In general, the position of the neutral axis N1 for the bending moment Bw in the stressed crankarm 22, 23 depends on the characteristics of the material and on the geometry of the cross section, namely on its shape, on whether it is a solid or hollow cross section, etc.

If the crankarm 22, 23 were made of a homogeneously distributed material with solid rectangular cross section (as schematically shown in FIG. 3), the neutral axis N1 for the bending moment Bw would be on the axes plane R (horizontally in FIG. 3).

The neutral axis N1 therefore defines the "border" between the portion of crankarm 22 subjected to tensile strain T1 and the portion subjected to compressive strain C1. The neutral axis N1 can also be regarded as the axis around which the cross section of the crankarm 22 subjected to the bending moment Bw "rotates".

Therefore, the strain in the crankarm 22, 23 associated with the effective component Fv of the force F is more marked—and thus more easily detectable—the further away one is from the neutral axis N1.

Strictly speaking, it should also be observed that, since the point O of application of the force F on the pedal 14 is displaced with respect to the rotation plane P of the crankarm 22, the tangential component Fv of the propulsion force F also causes a torsional moment around the axis U, that causes a torsional strain Qu in the crankarm 22, 23.

Figure 4:
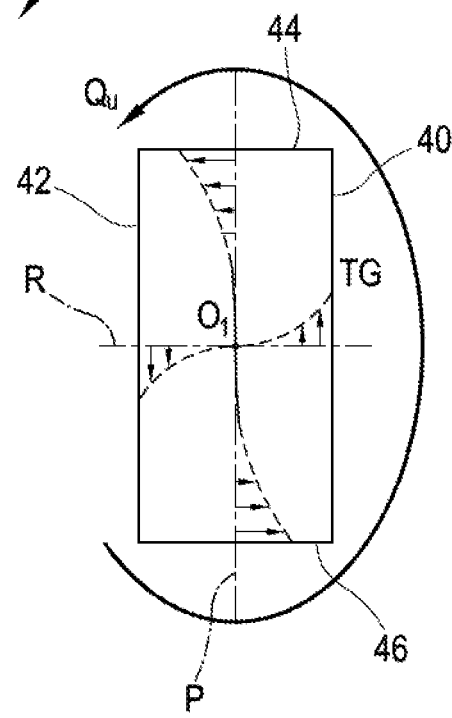

In particular and as shown in FIG. 4, the torsional strain Qu comprises tangential or shearing strains TG that, in a cross section of the crankarm 22, are maximum at the outer periphery and progressively decrease moving towards the center O1 of the cross section of the crankarm 22, until they possibly go to zero.

The radial and lateral components Fu, Fw are ineffective for the purposes of pedaling and therefore represent "lost" components of the force F, which however contribute to straining the crankarm 22, 23.

In particular, the radial component Fu, by virtue of the displacement of the point of application O, and the lateral component Fw cause a second bending moment Bv and a second bending strain still indicated with Bv, which causes the crankarm 22, 23 to bend towards the frame (in the case of a positive component in the reference system shown).

Figure 5:
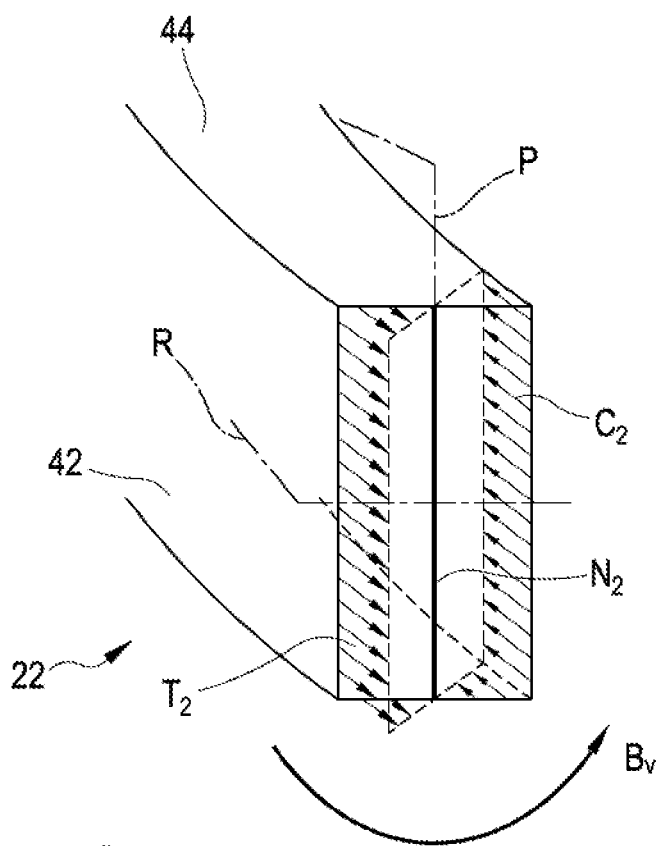

As shown in FIG. 5, the bending strain Bv comprises a tensile strain T2 and a compressive strain C2 at the two opposite sides of the crankarm 22 with respect to the rotation plane P.

The radial component Fu also causes in the crankarm 22 an axial tensile strain (in the case of a positive component in the reference system shown). Such an axial tensile strain is disregarded hereinafter, since it is typically of negligible size with respect to the aforementioned tensile strain T1 and T2 and compressive strain C1 and C2.

In any cross section of the crankarm 22, 23 it is possible to identify a second neutral axis N2 for the bending moment Bv.

Again if the crankarm 22, 23 were made of a homogeneously distributed material with solid rectangular cross section, as shown as an example in FIG. 5, the neutral axis N2 for the bending moment Bv would be on the rotation plane P of the crankarm 22, 23 (vertically in FIG. 5).

In the case of a crankarm 22, 23 having a non-rectangular cross section and/or a hollow cross section and/or made of non-homogeneous material, like for example a layered composite material, and/or of variable cross section along the length direction L of the crankarm 22, 23, the state of strain in the crankarm 22, 23 is even more complex than what has been described. However, what has been stated in relation to the regions of the crankarm 22, 23 in which the strains are of greater size and, therefore, easier to detect remains valid.

Moreover, it is in general possible to identify the aforementioned neutral axes N1, N2, although possibly displaced with respect to the axes plane R and to the rotation plane P, respectively.

Therefore, the evaluation of the force F for a torque meter or a power meter, and in particular of its sole effective component, namely the tangential component Fv, can take place based on the measurement of the aforementioned bending strain Bw. It can be based, alternatively or additionally, on the measurement of the torsional strain Qu.

Turning back to FIG. 2, the spider legs 36 of the crankarm 22 on the chain side, in transferring the rotary motion to the chainring(s) 30 to which they are connected, undergo a certain degree of stress and strain due to the inertia to rotate of the transmission chain (or belt) 16.

Such stress and strain also impact on the main body 38 of the crankarm 22 on the chain side. The consequent stress and strain in the main body 38 of the crankarm 22 on the chain side 16, hereinafter called "secondary stress and strain" for the sake of brevity, are again a bending moment BC and a bending strain BC similar to the strain Bw shown in FIG. 3, although typically the opposite way, which comprises a tensile strain T1 and a compressive strain C1 at the two opposite sides of the crankarm 22 with respect to the rotary plane R (although T1 and C1 typically are in opposite directions with respect to that indicated in FIG. 3).

The size of such a secondary strain is in general greater in the vicinity of the pivot end 24 of the crankarm 22, and decreases moving towards the free end 28, or end for connection with the pedal 14.

It should be emphasized that such secondary stresses/strains occur irrespective of whether the spider 36 is set into motion by acting directly on the crankarm 22 on the chain side 16—and therefore can be considered stresses/strains originating from forces/torques applied to the crankarm 22 at the pedal axis Y1—, or on the other hand by acting on the other crankarm 23—and therefore can be considered stresses/strains originating from forces/torques applied to the crankarm 22 at the rotation axis X.

However, while the secondary stresses/strains originating from forces/torques applied to the crankarm 22 at the pedal axis Y1 are in any case indicative of the specific pedaling torque or power of the right crankarm 22, which it is wished to measure, the secondary stresses/strains originating from forces/torques applied to the crankarm 23 opposite to the chain side (the left one), and therefore applied to the crankarm 22 on the chain side at the rotation axis X, are on the other hand an undesired effect during the measurement of the specific pedaling torque or power of the right crankarm 22. This phenomenon, which will be further considered hereinafter, is indicated briefly herein as "matching effect".

An instrumentation used to measure strain on a structure or component, in the particular case here of interest a crankarm 22 on the bicycle transmission or chain side, is a strain gage, in particular an electrical resistance strain gage.

A strain gage comprises an insulating flexible support that supports, typically by gluing, a coil-shaped, namely according to a zig-zag of parallel lines, grid, made through a metallic foil (photo-etched strain gages) or a thin metallic wire (metallic wire strain gages).

The strain gage is suitably attached to the component, typically through a suitable adhesive, for example a cyanoacrylate or an epoxy resin.

As is well known, the surface of the component onto which the strain gage is glued should be accurately prepared so that the adhesion of the strain gage thereto is reliable, and unpredictable measurement errors are avoided.

When the component is stressed, for example by the application of an external force/torque like the pedaling force F or forces deriving therefrom, the strain produced on the surface thereof in contact with the strain gage are transmitted to the grid; the consequent strains of the grid cause a change in the electrical resistance thereof.

The sensitivity of the strain gage is much greater in the direction parallel to the branches of the coil—hereinafter briefly indicated as "strain gage direction" or "detection direction" and taken as a reference when speaking of orientation of the strain gage—than in the direction orthogonal thereto: when the electrical conductor forming the coil is stretched, it becomes longer and thinner and its electrical resistance increases, while when it is compressed it shortens and widens, and its electrical resistance decreases.

More in particular, the change in electrical resistance R, not to be confused herein with the rotary plane R, is correlated to the strain through a quantity known as Gauge factor GF: indicating the strain with epsilon, in this case a percentage change in length given by deltaLe/Le wherein Le is the length, the following applies:

$$GF = \text{delta}R/R / \text{delta}Le/Le = \text{delta}R/R / \text{epsilon} \qquad (1)$$

In order to be able to read the small changes in electrical resistance induced by a strain of the component under measurement and by a consequent strain of the strain gage, a reading circuit is typically used, the output of which is an amplified signal function of such changes in resistance, typically a Wheatstone bridge reading circuit.

As known, a Wheatstone bridge comprises two resistive legs connected in parallel to one another and to a reference voltage; each resistive leg comprises two resistors connected in series. The output of the bridge is the difference in voltage between the two connection points of the series resistors; the coefficient of proportionality between the measured output of the bridge and the known reference voltage correlates the values of the four resistors with each other, values that can be in part known and in part unknown.

Ideally, it is wished for the electrical resistance of the strain gage to change only in response to the strain consequent to the specific applied force of interest, namely the force applied on the right pedal 14 in the case of a right crankarm 22.

However, the electrical resistance of the strain gage also changes in response to the secondary strain, in particular to that consequent to the force applied on the left pedal 15 due to the aforementioned matching effect.

For the detection of bending strain and bending moments, various measurement configurations are known, wherein two or more strain gages are applied on opposite faces and/or on the same face of the component, each with its own predetermined orientation. A Wheatstone bridge reading circuit takes care of reading the output of the strain gage, respectively of the combination of the outputs of the two or more strain gages, in order to provide the desired strain measurement.

Now, with reference to FIGS. 2 and 6-9, the crankarm 22 configured for mounting on the bicycle transmission side, and as stated comprising a main body 38, will be considered in detail. The main body 38 has a length Lp measured along the length direction L from the rotation axis X to the pedal axis Y1. The measurement unit indicated in the abscissa-axis in FIGS. 6-9 is the millimeter, however merely for indicating purposes.

The crankarm 22 comprises at least one detector 100 of stresses/strains for a torque meter or a power meter.

The detector 100 is in particular a detector of bending moment/bending strain, more in particular it is a strain gage having a length Le.

In the merely illustrative case shown, the detector 100 is applied to the outer surface of the crankarm 22. It should however be understood that the positioning of the detector 100 in the direction transversal to the crankarm 22 can be whatever, both on the outer surface of the crankarm 22 and inside the cross section (section plane T) delimited by such an outer surface. In greater detail, the at least one stress/strain detector 100 can be applied to an outer surface of the crankarm 22, to an surface exposed in an inner cavity (not visible in FIG. 2) of the crankarm and/or be incorporated in the material of the crankarm 22, in particular it can be co-molded with the composite material itself in the case of a crankarm 22 made of composite material.

In the present description and in the attached claims, under "co-molded", that the crankarm 22 is molded, as a single piece, with the stress/strain detector 100 or other elements already inserted thereinside is meant to be indicated; a co-cross-linking may or may not occur between co-molded elements.

In the merely illustrative case shown, the detector 100 is shown applied to the top face 44 of the crankarm 22. However, it should be understood that it could be applied to another of the faces 40, 42, 46 of the crankarm 22 or, if it is not applied to the outer surface, it could be parallel or substantially parallel to the top face 44 or to another of the faces 40, 42, 46 of the crankarm 22, or even be arranged in a plane forming an acute angle with one of the faces 40, 42, 44, 46 of the crankarm 22.

Preferably, the detector 100 is arranged in a plane parallel to the neutral plane N1 (FIG. 3) with respect to the main stress/strain to be detected, which is the one directly consequent to the application of the force F to the pedal 14 of the crankarm 22 itself, but alternatively it can be arranged in a plane orthogonal to or forming any angle with such a neutral plane N1.

However, the crankarm 22 preferably comprises at least one other detector (not shown), that, in the configuration shown, will preferably be applied to the outer surface of the crankarm 22, to the bottom face 46, so as to equip the crankarm 22 in one of the aforementioned typical configurations. Therefore, preferably the first detector 100 and the second detector are positioned on opposite sides with respect to a plane comprising the pedal axis Y1 and the rotation axis X of the crankarm 22. They are also advantageously each arranged as far as possible from the neutral plane or axis (N1 in FIG. 3) with respect to the main stress/strain to be detected.

In other cases, said at least one other detector can be arranged on the same face or plane as the detector 100 in one of the other aforementioned typical configurations. In general, as to the positioning and the orientation of said at least one other detector, everything described in the present description with reference to the detector 100 is valid.

For the sake of brevity, in the rest of the present description reference will only be made to detector 100, but the same considerations are valid for every detector with which the crankarm is equipped.

The detector 100 is shown in a position along the length direction L of the crankarm 22—hereinafter indicated for brevity simply as "position"—representable for the sake of simplicity through the distance Do of its center C from the rotation axis X, although it could be represented as distance Dp from the pedal axis Y1, the sum of such two distances Do, Dp indeed being equal to the aforementioned length Lp of the crankarm 22.

Figure 6:
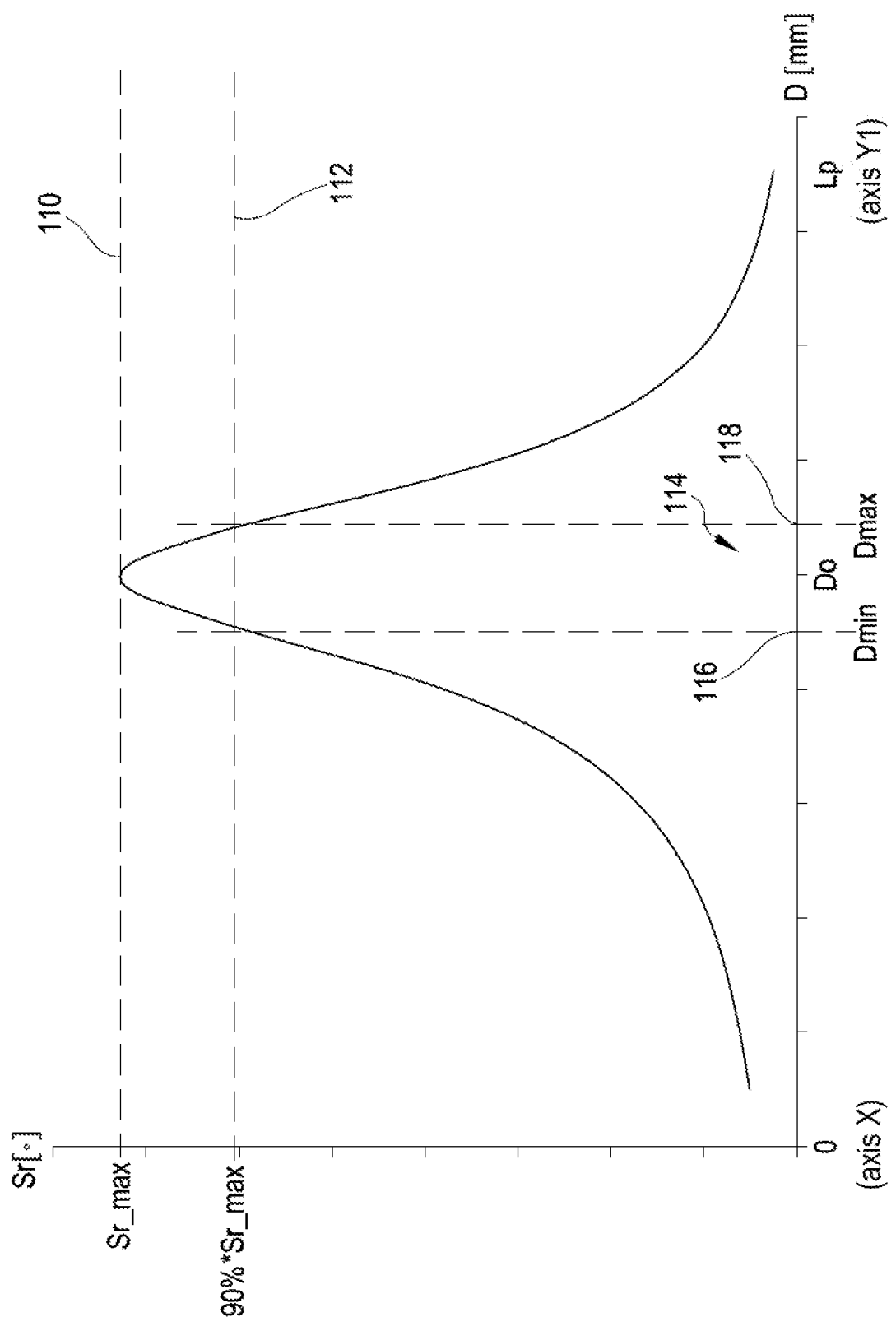
FIGS. 6-9 are representations of an illustrative shape of some curves representative of some characteristic functions of the crankarm of FIG. 2.
Figure 7:
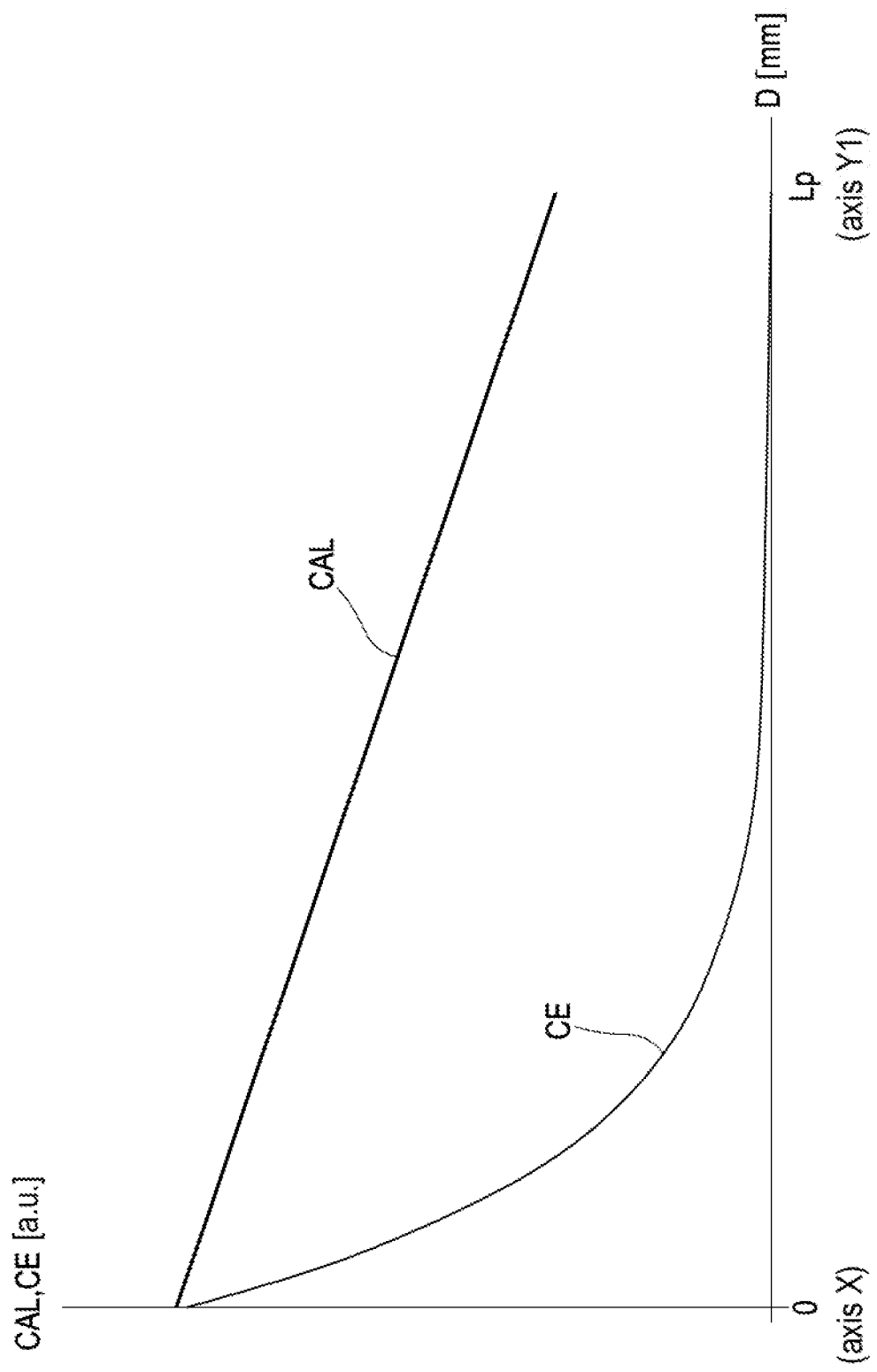

With reference to FIGS. 6-7, which are diagrams in which the abscissa-axis represents the distance D from the rotation axis X and the vertical-axis represents the curves discussed hereinafter, the specific position of the detector 100 is selected so as to provide a particularly accurate detection of the pedaling torque or power, in particular it is selected so as to maximize, instead of the absolute sensitivity of the detector 100, a specific sensitivity ratio Sr, an indicative and non-limiting shape of which is depicted in FIG. 6 (the unit of measurement is dimensionless).

The sensitivity ratio Sr is defined as ratio between two curves, an exemplary shape of which is depicted in FIG. 7:

a) the sensitivity CAL of the detector 100 to stresses/strains originating from forces/torques applied to the crankarm 22 at the pedal axis Y1, and b) the sensitivity CE of the detector 100 to stresses/strains originating from forces/torques applied to the crankarm 22 at the rotation axis X.

The units of measurement of the vertical-axes of the two curves CAL and CE are arbitrary, but preferably equal to each other, so that the sensitivity ratio Sr is advantageously dimensionless. Such units of measurement correspond to, or in any case are uniquely correlated to, the output of the detector 100. For example, in the case of a detector 100 associated with a reading circuit comprising an A/D converter, the curves CAL and CE can be expressed as numerical count/N*m versus millimeters.

As discussed above, the pedaling force applied to the pedal 14 of the crankarm 22 itself falls within the forces mentioned sub a) and relative to curve CAL.

As discussed above, the matching effect due to the pedaling force applied to the pedal 15 of the other crankarm 23 of the crankset 10 falls within the forces mentioned sub b) and relative to curve CE.

Under "maximize", herein instead of a precise figure corresponding precisely to the mathematical maximum of the sensitivity ratio Sr, indicated with Sr_max in FIG. 6, a value that approaches the maximum value is broadly meant to be indicated, in particular being equal to or greater than 90% of the maximum value of such a sensitivity ratio Sr along the length Lp of the crankarm.

With such positioning, the advantages discussed in the introductory part of the present document are obtained, briefly stated, advantages are obtained in terms of accuracy of the detection by the detector 100 of the torque or power applied to the crankarm 22 on the chain side, since the above described matching effect with the other crankarm 23 is minimized.

FIGS. 6-7 are further described hereinafter, when ranges of values for the distance Do that achieve the aforementioned maximizing of the sensitivity ratio Sr will also be indicated.

A methodology for determining the aforementioned position (distance Do) for the detector 100 comprises determining curves—in the broad meaning of the term stated above—that represent the sensitivities CAL and CE defined sub a) and sub b) in so-called setting conditions, i.e. not in operative conditions, determining a curve Sr that represents the ratio thereof, and determining a precise position, a set of positions, or a (continuous or discontinuous) range of positions, in which such a ratio is sufficiently high.

Figure 8:
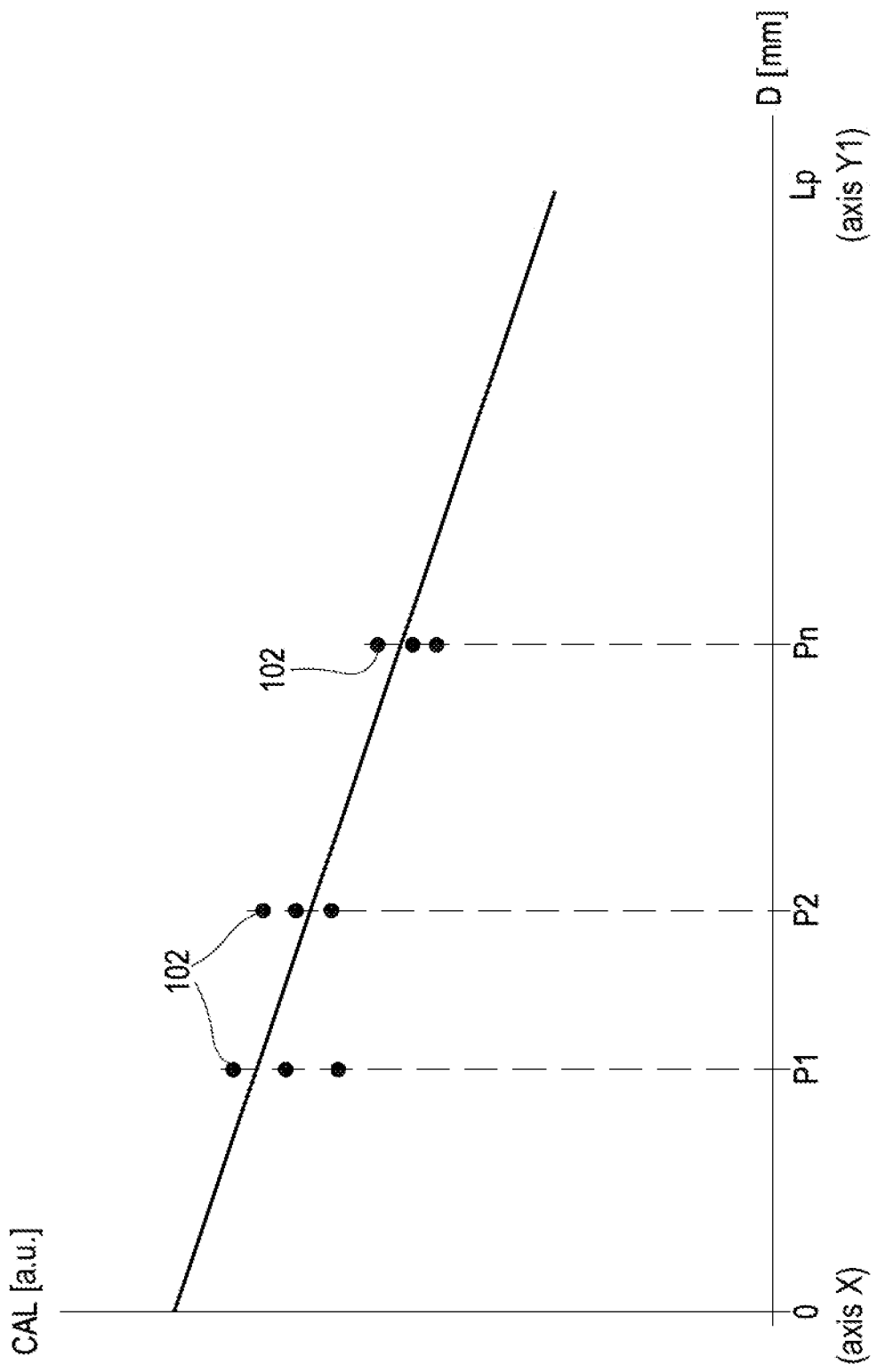
Figure 9:
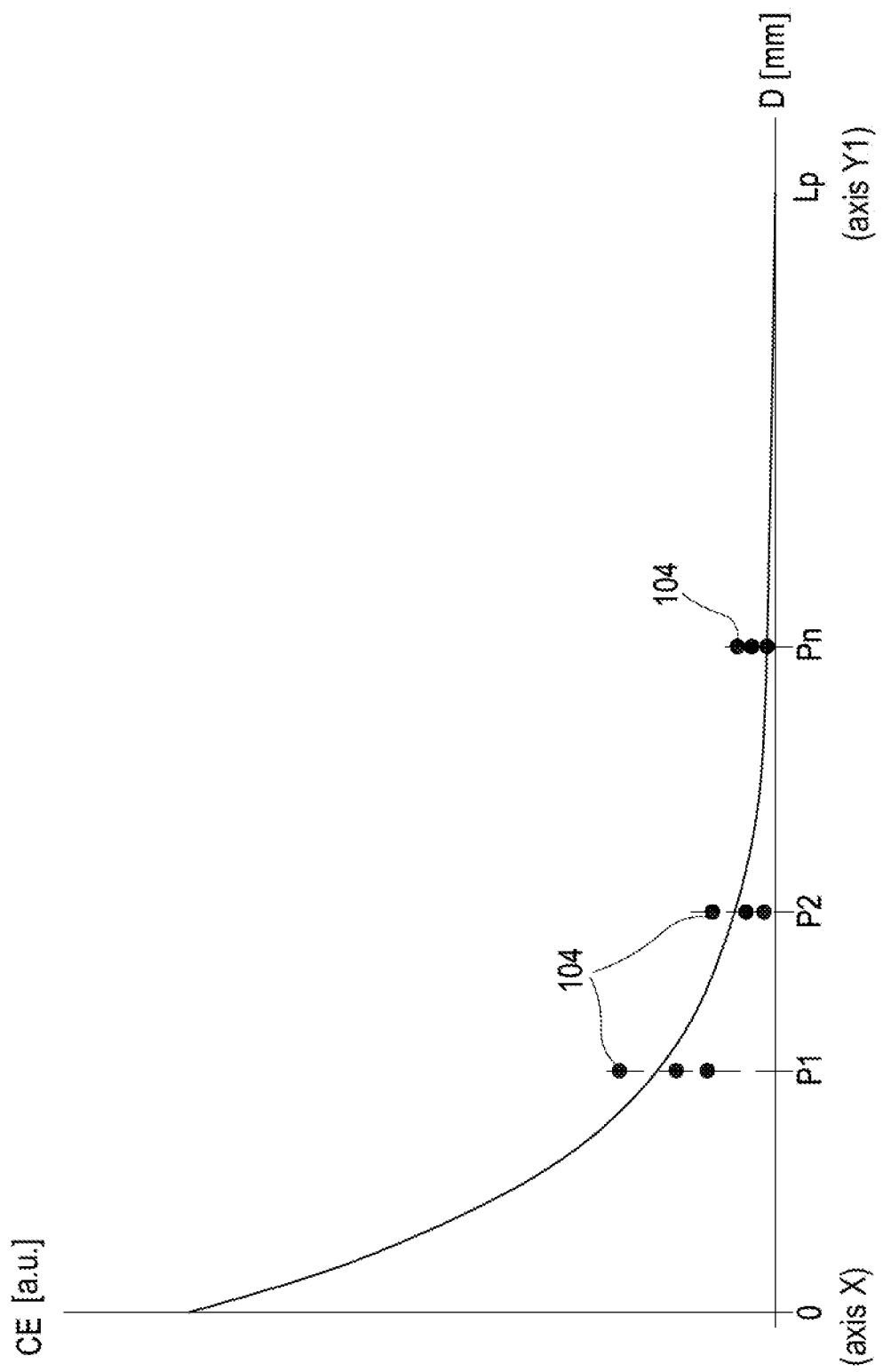

In detail, the methodology comprises the steps of:

determining a first curve CAL, a totally indicative and non-limiting shape of which is shown in FIGS. 7 and 8, representative of the change in the output signal of the detector 100 along length Lp in a first setting condition in which only a force/torque at the pedal axis Y1 is applied, determining a second curve CE, a totally indicative and non-limiting shape of which is shown in FIGS. 7 and 9, representative of the change in the output signal of the detector 100 along said length Lp in a second setting condition in which only a force/torque at the rotation axis X is applied, determining a sensitivity-ratio curve Sr, a totally indicative and non-limiting shape of which is shown in FIG. 6, representative of the change along said length Lp of the ratio between the value of the first curve CAL and the value of the second curve CE, determining the maximum value Sr_max of the sensitivity-ratio curve Sr, determining the available position(s) along said length Lp in which said sensitivity-ratio curve Sr is greater than 90% of the aforementioned maximum value Sr_max, and selecting said position (distance Do) as said or one of the available position(s).

The detector 100 is then fixed in the predetermined position.

The steps of determining the first curve CAL and the second curve CE can be carried out through modeling and simulation, but are preferably carried out through sampling, especially in the case of a crankarm 22 made of composite material, the mechanical properties of which are not easy to model.

With reference to FIGS. 8 and 9, according to such a methodology steps are taken to acquire a double plurality of readings by arranging the detector 100—or a nominally equal sample detector—from one time to the next in a different "sampling" position P1, P2, . . . , Pn on the crankarm 22 to be equipped—or on a nominally equal sample crankarm—and applying, for each "sampling" position, P1, P2, . . . , Pn, first only a force/torque corresponding to that of pedaling on the right pedal 14, and then only a force/torque corresponding to that of pedaling on the left pedal 15. It is understood that the sequence of application of the two forces/torques is indicative and not limiting; it is also possible to apply first a force/torque in all of the positions, and then the other force/torque in all of the positions.

Instead of moving the detector 100 every time, it is possible to use many detectors, of course having the same characteristics—indicated herein as sample detectors.

The methodology therefore comprises the steps of:

defining a plurality of sampling positions P1, P2, . . . Pn (indicated for convenience on the axis of the distances of FIGS. 7-9) distributed along the main body 38 of the crankarm 22, or of a nominally equal sample crankarm, fixing, at each of said sampling positions P1, P2, . . . Pn, said at least one detector 100 in sequence, or a nominally equal sample detector, applying a predetermined and known first force F1 (not shown) to the crankarm 22 at the pedal axis Y1, and taking a reading of said at least one detector 100 or sample detector while said at least one detector 100 or sample detector is fixed at each sampling position P1, P2, . . . Pn, thereby acquiring a corresponding plurality of first readings 102 (FIG. 8), applying a predetermined and known second force F2 (not shown), preferably having the same intensity as F1, to the crankarm 22 at the rotation axis X, and taking a reading of said at least one detector 100 or sample detector while said at least one detector 100 or sample detector is fixed at each sampling position P1, P2, . . . Pn, thereby acquiring a corresponding plurality of second readings 104 (FIG. 9), wherein the first curve CAL is determined based on the plurality of first readings 102, and wherein the second curve CE is determined based on the plurality of second readings 104.

For each "test" position plural readings can also be taken, changing the intensity of the forces/torques F1 and/or F2 and/or changing the sample detector and/or changing the sample crankarm, so as to also take the intrinsic response of the detector and the variables due to the non-repeatability of the local characteristics of the material of the crankarm 12 into account.

For the plurality of readings 102 taken in the condition of application of force/torque sub a), the curve CAL is thus obtained through a suitable interpolation method, for example the linear regression.

Similarly, for the plurality of readings 104 taken in the condition of application of force/torque sub b), the curve CE is obtained through a suitable interpolation method, for example the regression.

The methodology adopted to determine one of the two curves CAL, CE could also be different from the methodology adopted to determine the other curve.

Turning back to FIG. 6, curve Sr is representative of the ratio between the two curves CAL and CE of FIG. 7. Curve Sr can be calculated parametrically or point by point.

The straight line 110 indicates the maximum value Sr_max of the curve Sr.

The straight line 112 indicates the threshold value, for example selected equal to 90%, of the maximum value Sr_max.

Any position corresponding to the range of positions 114 wherein curve Sr is above the straight line 112 is suitable for fixing the detector 100.

In said position in which the detector 100 is fixed (distance Do), the sensitivity ratio Sr is advantageously equal to or greater than 20:1.

The extremes of the range of positions 114 are indicated as the point 116 corresponding to the distance Dmin and the point 118 corresponding to the distance Dmax from the rotation axis X.

Said position in which said at least one detector is fixed is at a distance Do from the rotation axis X of the crankarm 22 corresponding to a range comprised between about 45% and 65%, more preferably between about 48% and 62%, even more preferably between about 50% and 60%, even more preferably between about 52% and 58% of the length Lp of the main body 38 of the crankarm 22.

From FIG. 7 it can be seen that the shape of both curves CAL and CE is a decreasing one going from the rotation axis X to the pedal axis Y1. However, curve CAL is rectilinear and not very slanted, while curve CE decreases much more quickly. The difference in ordinate is therefore variable along the length Lp of the crankarm 22, and it could also be selected as the variable to be maximized through the choice of the position of the detector 100, as an alternative to the sensitivity ratio Sr. The Applicant has however found that the choice of instead maximizing the sensitivity ratio Sr achieves much better results.

As already discussed, the position (distance Do) that maximizes the sensitivity ratio Sr and therefore the accuracy of the detection can even change substantially depending on the material constituting the crankarm 22.

On the other hand, the accuracy of the detections carried out with the measuring device 100 is also affected by factors linked to the specific shape of the cross section and to the changes thereof along the crankarm 22, including the wall thickness in the case of a hollow crankarm.

Another factor that influences the accuracy of the detections carried out with the measuring device 100 is the material constituting the crankarm 22, and in particular local density changes thereof. This factor is particularly critical in the case of a crankarm made of composite material comprising structural fiber incorporated in a polymeric matrix.

Another particular ratio can perform an important role in minimizing the influence of one or more of such factors—and not necessarily subordinately to the positioning at the distance Do indicated above, such as to maximize the sensitivity ratio Sr.

Again with reference to FIG. 2, it is a length ratio Lr (not shown) between the length Le of the detector 100 and the length Lp of the main body 38 of the crankarm 22:

$$Lr=Le/Lp \qquad (2)$$

Preferably, the length ratio Lr (not shown) is equal to or greater than a minimum length ratio Lr_min (not shown). The minimum length ratio is preferably equal to 1%, more preferably equal to 2%, even more preferably equal to 3%, even more preferably equal to 5.7%, even more preferably equal to 6%, even more preferably equal to 7%.

As discussed in the introductory part, with such minimum values Lr_min of the length ratio Lr a reliable reading of the detector 100 is obtained even in the presence of local inhomogeneities of the material of which the crankarm 22 is made, as it happens in particular in the case of a crankarm made of composite material comprising structural fiber incorporated in a polymeric matrix.

Alternatively or additionally, the length ratio Lr is preferably less than or equal to a maximum length ratio Lr_max. The maximum length ratio is preferably equal to 15%, more preferably equal to 13%, even more preferably equal to 11.6%, even more preferably equal to 9%, even more preferably equal to 8%, even more preferably equal to 7%.

As discussed, with such maximum values of the length ratio the drawback of the reading of the detector 100 becoming greatly affected by changes in shape and/or material along the crankarm 22 itself, which would in fact be averaged by the detector 100 in such a manner as to lead to an inaccurate or unreliable reading, is avoided.

The length ratio Lr is selected, preferably within the ranges defined by one of the minimum values and one of the maximum values indicated above, as a function of the characteristics of shape and material of the crankarm 22.

Preferably, the minimum length ratio Lr_min is inversely proportional to an estimated homogeneity value of the material from which the crankarm 22 is made.

Therefore, in the case of a crankarm 22 made of a less homogeneous material (for example a composite material, comprising a polymeric matrix comprising structural fibers) the minimum length ratio Lr_min necessary to ensure a good reading of the strain gage or detector 100 will be greater with respect to the minimum length ratio Lr_min necessary in the case of a crankarm made of a more homogeneous material (for example a metal alloy).

Given the critical issues highlighted above, once the desired positioning of the detector 100 in the crankarm 22 has been established, it is suitable for the detector 100 to be effectively positioned in the most precise way possible.

Figure 10:
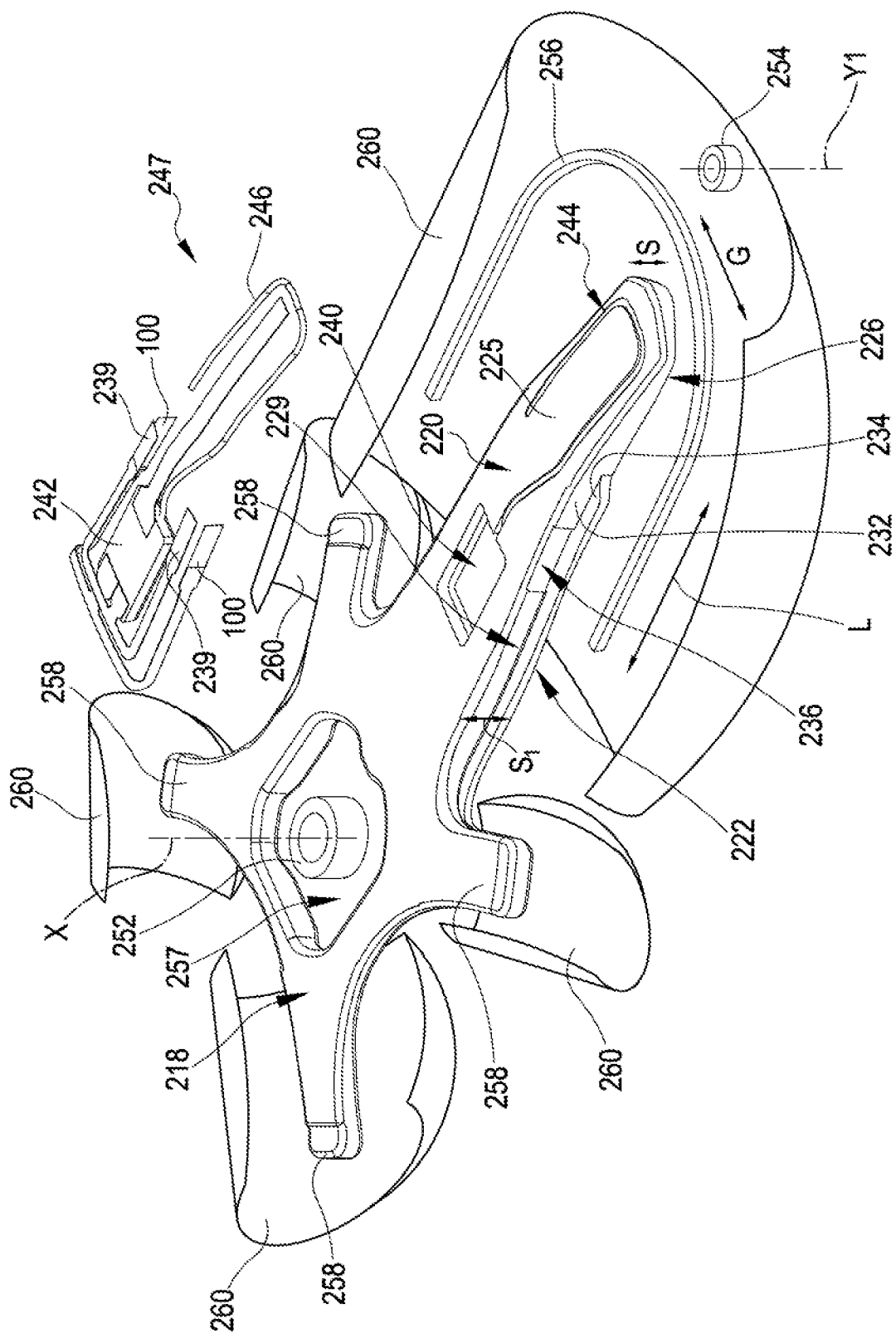
FIGS. 10-11 are perspective and exploded views of steps of an embodiment of a process for manufacturing the crankarm of FIG. 2.
Figure 11:
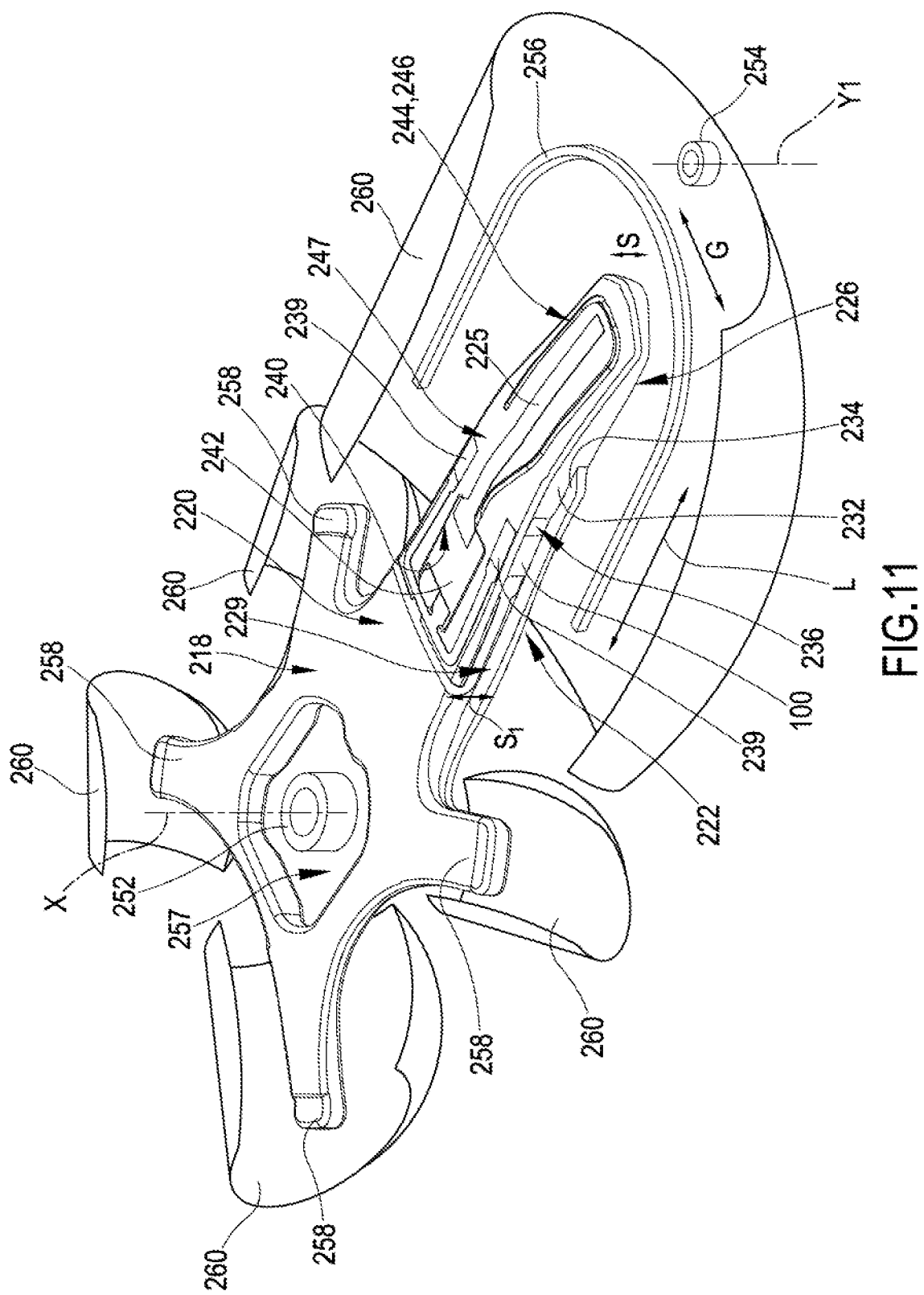

For this purpose, the following method, described with reference to FIGS. 10-11, may be particularly useful, especially in the case of a crankarm 22 made of composite material.

In order to manufacture the crankarm 22 a shaped rigid core 218 is used, preferably intended to be later removed as described hereinbelow, and the shape of which may therefore determine the shape of a cavity (not shown) inside the finished crankarm 22.

The expressions "length direction", "width direction", "thickness direction", "proximal face" and "distal face" are used with reference to the core 218 in an analogous way to what has been defined above with reference to the crankarm 22.

In particular the core 218, at least in a longitudinally central region thereof, has a first region 220 (central in the width direction) that has a maximum thickness Si (constant or anyway little and steadily variable), and two projections from one side and the other in the width direction G, only one of which, indicated with reference numeral 222, is visible.

Each projection 222 is flush with a face of the core 218, preferably with the proximal face 226 of the core.

In the transition from each projection 222 to the central region 220, a step 229 is therefore defined, having a riser surface 232 and a "tread" surface 234, preferably orthogonal or approximately orthogonal to one another. The "tread" surface 234 is part of the projection 222 and extends substantially along the length direction L and along the width direction G. The riser surface 232 is part of the central region 220 and extends substantially along the length direction L and along the thickness direction S. The riser surface 232 is therefore essentially orthogonal to the distal face 225.

The core 218 comprises grooves and/or recesses intended to house electrical/electronic components in a predetermined and more protected position, such as integrated circuit boards, flexible circuits and/or connection cables between electronic components internal and/or external to the finished crankarm.

In the case shown there are provided recesses 236 for sensors, in particular for said detector(s) 100 (stress gages or other elongation/contraction sensors) and/or for temperature sensors 239, preferably on the riser surfaces 232 of the steps 229, a recess 240 for a printed circuit board or PCB 242, a recess 244 for cables and/or flexible circuits 246, preferably on the distal face 225, a circular recess (not visible) to define the position of an evacuation hole described hereinafter, preferably on the proximal face 226.

In the manufacturing process of the crankarm 22, indeed, one or more detector(s) 100 (and possible other sensors) are first fixed on the riser surface 232 of the rigid core 218, preferably in a stable, but temporary manner, within the recesses 236. The meaning of the expression "stable, but temporary" will become clear upon reading the present description. Said other sensors 239, the cables and/or flexible circuits 246 and/or the PCB 242—suitably treated as described in a patent application filed on the same date by the same Applicant and titled "Bicycle component made of composite material and related manufacturing process", incorporated herein by reference—can also be fixed to the core 218.

Advantageously, as shown, the components 100, 239, 242, 246 form a pre-assembled instrumentation body 247; FIG. 11 shows the core 218 and the instrumentation body 247 in the fixing condition of the instrumentation body 247 to the core 218.

It should be noted that the sensors 239 of the instrumentation body 247 are fixed on the distal face 225 of the core 218, possibly providing for specific recesses (not shown). However, there could be, alternatively or additionally to the recesses 236 on the riser surface 232 of the rigid core 218, recesses on the tread surface 234 of the steps 229 of the core 218 for receiving these sensors 239.

In the instrumentation body 247, the position and the orientation of the detector(s) 100 and of the other sensors 239 could be reversed, in which case the detector(s) 100 would be arranged on the tread surface 234 or on the distal face 225 of the rigid core 218, preferably in recesses (not shown) suitably positioned to receive them.

The detector(s) 100 and/or the other sensors 239 can also be arranged on the proximal face 226 of the rigid core 218, preferably in recesses (not shown) suitably positioned to receive them.

It should be noted that both the detectors 100 and the other sensors 239 are oriented along the length direction L of the crankarm 22.

In this way, the detector(s) 100 (and the sensors 239) have the optimal alignment for the detection of the traction and/or compression stresses due to the pedaling force F.

The bottom bracket spindle 26, or a portion thereof, and the pedal pivot 34 (FIG. 1), or corresponding metallic bushes 252, 254, possibly internally threaded, or also threaded inserts (masters) for making holes for such spindles/pivots, are positioned at the two ends of the core 218.

Thereafter, a "cord" of composite material 256 preferably comprising substantially unidirectional structural fiber is positioned in the recess determined by each step 229, wherein the direction of the unidirectional fiber is substantially aligned with the length direction L of the crankarm 22. The cord 256 can be formed of one or more rolled up plies of composite material, or it can comprise a braid or similar of dry unidirectional fiber, which is impregnated with polymeric material prior to the insertion in a mold, or impregnated with polymeric material during molding. A single looped cord 256 can be used, or two cords can be used, each on one side of the core 218. The cord 256 can also be partially hardened.

It should be noted that the detectors 100 (and the sensors 239) are in contact with the cord 256: this can be particularly advantageous to improve the reliability of detection of elongation/contraction because they turn out to be extended according to the direction of the fibers of the composite material.

Thereafter, one or more other plies 260 of composite material of any of a variety of types are wound on the structure thus prepared.

Like the cord 256, also the plies 260 may or may not be pre-impregnated, in the latter case the polymeric material being subsequently injected into the mold.

Alternatively to the cord 256 and to the plies 260 of composite material, non-ply composite material can be used, as stated above.

The structure is inserted in the mold and the composite material is consolidated, subjecting it to a suitable temperature and pressure profile. The material of the core 218 should be suitably selected so as to withstand the molding pressure and temperature, keeping its shape until hardening of the composite material, still ensuring precise positioning of the detector(s) 100 (as well as of the sensors 239 and of the PCB 242) inside the finished crankarm 22, in particular inside the inner cavity if the core 218 is removed.

After the extraction from the mold, the aforementioned evacuation hole (not shown) can be made, for example on the proximal face 226 of the crankarm 22, and the core 218 can be suitably melted and allowed to pour out through the hole. For this purpose, the core 218 is in particular made of a low melting point metallic alloy, the melting point of which is less than 140° C.

The melting process of the alloy takes place in particular—as known for example from document EP1818252A1, incorporated herein by reference—, by placing the semi-finished product in an oil bath at a higher temperature than the melting point of the alloy. In this way, melting of the core 218 takes place without the composite material being damaged by too high temperatures.

The fixing of the detector(s) 100 (as well as of the sensors 239) to the core 218 should be such as to keep it/them in position during the assembly of the structure to be molded and during molding, but it should have a lower cohesion force than that which is established between said components and the composite material, so that, when the core 218 is extracted, those components remain fixedly connected to the crankarm.

On the other hand, it is proper for the cables and/or flexible circuits 246, a length of which has to be brought out through the evacuation hole, not to adhere at all to the crankarm 22, at least at their free end portion.

The fixing of said PCB 242 and/or of the cables and/or flexible circuits 246 to the core 218 should similarly be such as to hold them in position during the assembly of the structure to be molded and during molding, and such that they are not dragged away by the molten core 218 coming out from the evacuation hole, but on the one hand the same precision of positioning of the detector(s) 100 (and sensors 239) is not required, on the other hand it is not strictly necessary for said elements 242, 246 to adhere to the inner surface, exposed into the cavity of the finished crankarm 22—although it is greatly preferred so as to avoid noises and bouncing with consequent manifest problems during the use of the crankarm 22.

However, the preferred configuration of pre-assembled instrumentation body 247 advantageously also makes it easier to keep the various electrical/electronic components in position.

Following the evacuation of the material constituting the core 218, if provided for, the evacuation hole can be suitably plugged, preferably in a tight manner.

The inner cavity of the crankarm 10 thus formed can be finished thereafter by removing the possible metal residuals remaining after melting through an acid wash, provided that it does not damage the detector(s) 100 and/or the other sensors 239.

The crankarm 22 can be subjected to a further finishing cycle of the outer surface, for example by subjecting it to sandblasting, and the manufacture ends with the fixing of possible metallic parts provided on the crankarm 22.

For example, one or more chainrings 30 are fixed, typically by gluing, to a spider 36 thereof. Indeed, the rigid core 218 comprises, on the side of the rotation axis X of the finished crankarm, a central hole 257 and projections 258 extending radially around the hole 257, which will define extensions of the inner cavity of the crankarm 22 inside a corresponding number of spider legs 36 thereof (FIG. 1), extending radially around the metallic bush 52. The number of projections 258, respectively spider legs 36 of the crankarm 22 is not necessarily equal to four as shown.

It should be emphasized that, by the manufacturing process illustrated above, said at least one detector 100 (as well as other electrical/electronic components) is therefore co-molded with the composite material of the crankarm 22, namely the crankarm 22 is molded, as a single piece, with said detector 100 already inserted thereinside.

The crankarm 22 therefore has, integrated in its main body, said at least one detector 100, and possibly the other electrical/electronic components.

Said at least one detector 100 (and possibly the other electrical/electronic components) is therefore advantageously enclosed in the composite material that forms the crankarm 22, and very well protected thereby against collisions, water, dirt and atmospheric agents.

The electrical/electronic components housed in the crankarm should be such as to withstand the pressure and temperature profile of the molding process—more critical in the case of composite material with thermosetting polymeric material than in the case of composite material with thermoplastic polymeric material—, as well as the acid wash if carried out, possibly when suitably protected.

It is worthwhile emphasizing that said at least one detector 100 and the possible other sensors 239, or some of them, can also be connected after the molding of the crankarm 22, and in particular fixed to the outer surface of the crankarm 22.

Alternatively, it is possible to provide a core 218 suitably designed and made to be kept seated, inside the finished crankarm 22, after molding is complete. In this case, it defines anyway a sort of inner cavity within the composite material forming the shell or outer cladding of the crankarm 10.

The core that stays in the finished crankarm can be provided in a particularly light material, like for example high-density polypropylene or hardened composite material (which may or may not be the same as the composite material forming the shell of the crankarm 22), or in the form of a framework suitably configured for and having such a stiffness as to ensure the correct positioning of said at least one detector 100 (and of the sensors 239) in the finished crankarm.

In the finished crankarm 22, said at least one detector 100 and the other electrical/electronic components do not turn out to be exposed, and are moreover sealed in an impermeable manner, protected against a possible entry of water and/or dirt in the cavity of the crankarm 22.

Finally, given that said at least one detector 100 and the other sensors 239 (and the other electrical/electronic components) are totally concealed from view, the appearance of the crankarm 22 is substantially improved.

It is also possible to arrange composite material between the core 218 and said at least one detector 100, so as to obtain a crankarm 22 provided with a cavity in which said at least one detector 100 is immediately adjacent to the cavity, still being completely surrounded by the composite material. If on the one hand this process helps to keep in position said at least one detector 100 after molding, and to protect it from possible infiltrations in the cavity, on the other hand during molding said at least one detector 100 can move more than when it is fixed temporarily to the core and/or housed in a recess of the core, for which reason the positioning of said at least one detector 100 and of the other electrical/electronic components in the crankarm 22 turns out to be less precise.

As stated several times, the detector 100 described above can be intended for use in a power meter or a torque meter. From a mathematical point of view, as already described above, the pedaling power is the useful component of the power delivered by the cyclist, given by the torque applied on either or both of the pedals 14, 15, multiplied by the angular speed of the respective crankarm 22, 23.

The torque is in turn given by the product of the force component Fv in the tangential direction by the arm, which substantially corresponds to the length of the crankarm 22, 23 (to the length Lp in the case of the right crankarm 22).

The angular speed is typically provided by a cadence sensor. Alternatively, the angular speed can be obtained by an accelerometer that detects the pedaling cadence from the alternation of the force of gravity with respect to the rotary plane R of the crankarm 22, 23.

Alternatively, the angular speed of the crankset 12 and therefore of the crankarm(s) 22, 23 can be calculated from the bicycle speed, in turn possibly determined by a cadence sensor applied to a wheel, and from the current gear ratio.

The data relative to the applied torque is collected by the power meter at the crankset 12.

The invention can apply to a symmetrical torque or power detection system, comprising two sub-systems made at each crankarm 22, 23 of the crankset, or to a non-symmetrical torque or power detection system, comprising one sub-system at the crankarm 22 on the transmission side and the other sub-system at the bottom bracket spindle 26 (to detect torque or power applied onto the pedal on the side opposite to the transmission side), or furthermore to a torque or power detection system made at only the crankarm 22 on the transmission side. In this last case, the torque or power delivered by the cyclist is estimated as double that measured.

Although the invention has been described in detail with reference to strain gages, the invention can also be applied to different types of sensors, for example piezoelectric sensors.

What has been stated above in relation to the length ratio Lr and/or to the provision of the recesses 236 in the core 218 and/or in relation to the provision of the pre-assembled body 247 is also applicable independently from what has been stated above in relation to the distance Do and to the sensitivity ratio Sr, and also to the left crankarm 23, which is not affected by the matching effect. In the case of a left crankarm 23, the core 218 will be free of the projections 258.

The above is a description of various embodiments of inventive aspects, and further changes can be made without departing from the scope of the present invention. The shape and/or size and/or location and/or orientation of the various components and/or the succession of the various steps can be changed. The functions of an element or module can be carried out by two or more components or modules, and vice-versa. Components shown directly connected to or contacting each other can have intermediate structures arranged in between them. Steps shown directly following each other can have intermediate steps carried out between them. The details shown in a figure and/or described with reference to a figure or to an embodiment can apply in other figures or embodiments. Not all of the details shown in a figure or described in a same context must necessarily be present in a same embodiment. Features or aspects that turn out to be innovative with respect to the prior art, alone or in combination with other features, should be deemed to be described per se, irrespective of what is explicitly described as innovative.

What is claimed is:

1. A bicycle crankarm for mounting on a bicycle transmission side, comprising a main body having a length (Lp) measured along a length direction (L) from a rotation axis (X) to a pedal axis (Y1) of the crankarm, said crankarm having at least one stress/strain detector for a torque meter or a power meter, oriented along the length direction (L), wherein said at least one detector is fixed at a distance (Do), measured from a center of said at least one stress/strain detector to the rotation axis (X) of the crankarm, such that a ratio between said distance (Do) and said length (Lp) is in a range between 0.45-0.65.

2. The bicycle crankarm according to claim 1, wherein said ratio is in the range between 0.48-0.62.

3. The bicycle crankarm according to claim 2, wherein said ratio is in the range between 0.50-0.60.

4. The bicycle crankarm according to claim 3, wherein said ratio is in the range between 0.52-0.58.

5. The bicycle crankarm according to claim 1, wherein the crankarm is made at least in part of composite material comprising structural fiber incorporated in a polymeric matrix.

6. The bicycle crankarm according to claim 5, wherein said at least one detector is integrated in said crankarm.

7. The bicycle crankarm according to claim 5, wherein said at least one detector is positioned on a first face of the crankarm, and comprising at least one second detector arranged on a second face of the crankarm opposite said first face.

8. The bicycle crankarm according to claim 5, further comprising at least one cavity, and said at least one detector is on an inner face of the cavity.

9. The bicycle crankarm according to claim 5, further comprising a core, wherein said at least one detector is arranged between the core and the composite material.

10. The bicycle crankarm according to claim 9, wherein said core has at least one recess, and said at least one detector is arranged in said at least one recess.

11. The bicycle crankarm according to claim 1, wherein said at least one stress/strain detector is at least one strain gage and a length ratio (Lr) of a length (Le) of the at least one strain gage over the length (Lp) of the main body of the crank arm is at least 1% and no greater than 15%.

12. The bicycle crankarm according to claim 11, wherein the length ratio (Lr) is at least 2% and no greater than 13%.

13. The bicycle crankarm according to claim 11, wherein the length ratio (Lr) is at least 3% and no greater than 11.6%.

14. The bicycle crankarm according to claim 11, wherein the length ratio (Lr) is at least 5.7% and no greater than 9%.

15. The bicycle crankarm according to claim 11, wherein the length ratio (Lr) is at least 6% and no greater than 8%.

16. The bicycle crankarm according to claim 11, wherein the length ratio (Lr) is 7%.

17. A bicycle crankset comprising a bottom bracket spindle, a first crankarm on the transmission side according to claim 1, and a second crankarm on the side opposite to the transmission side.

18. A method for detecting pedaling torque or power applied to a crankarm of a bicycle configured for mounting on a bicycle transmission side, the method comprising the steps of:
a) providing a crankarm configured for mounting on the transmission side that has a main body with a length (Lp) measured along a length direction (L) extending from a rotation axis (X) to a pedal axis (Y1) of the crankarm; and
b) fixing at least one stress/strain detector for a torque meter or a power meter at a distance (Do), measured from the center of said stress/strain detector to the rotation axis (X) of the crankarm, such that a ratio between said distance (Do) and said length (Lp) is in a range between 0.45-0.65.

\* \* \* \* \*